United States Patent
Kmita et al.

(10) Patent No.: US 7,066,364 B2
(45) Date of Patent: Jun. 27, 2006

(54) VEHICLE ARTICLE CARRIER HAVING STOWABLE CROSS BARS

(75) Inventors: Gerard J. Kmita, Allen Park, MI (US); Jeffrey M. Aftanas, Ortonville, MI (US); Donald R. Potter, Clarkston, MI (US)

(73) Assignee: JAC Products, Inc., Saline, MI (US)

( * ) Notice: Subject to any disclaimer, the term of this patent is extended or adjusted under 35 U.S.C. 154(b) by 0 days.

(21) Appl. No.: 10/700,335

(22) Filed: Nov. 3, 2003

(65) Prior Publication Data
US 2004/0134950 A1 Jul. 15, 2004

Related U.S. Application Data

(63) Continuation-in-part of application No. 10/279,285, filed on Oct. 24, 2002, now Pat. No. 6,811,066.

(51) Int. Cl.
*B60R 9/04* (2006.01)
(52) U.S. Cl. ............... 224/321; 224/325; 224/326; 224/553
(58) Field of Classification Search ............... 224/321, 224/322, 324, 325, 326, 549, 553, 554, 924; 280/762, 769; 414/462
See application file for complete search history.

(56) References Cited

U.S. PATENT DOCUMENTS

| | | | |
|---|---|---|---|
| 3,670,935 A | 6/1972 | Hinkston | |
| 3,838,802 A | 10/1974 | Grycel, III | |
| 4,132,335 A * | 1/1979 | Ingram | 224/324 |
| 4,225,068 A | 9/1980 | Ingram | |
| 4,239,138 A * | 12/1980 | Kowalski | 224/321 |
| 4,295,587 A * | 10/1981 | Bott | 224/321 |
| 4,345,705 A | 8/1982 | Graber | |
| 4,406,386 A | 9/1983 | Rasor et al. | |
| 4,416,406 A | 11/1983 | Popeney | |
| 4,469,261 A * | 9/1984 | Stapleton et al. | 224/321 |
| 4,473,178 A | 9/1984 | Bott | |
| 4,487,348 A | 12/1984 | Mareydt | |
| 5,004,139 A | 4/1991 | Storm et al. | |
| 5,071,050 A | 12/1991 | Pudney et al. | |
| 5,104,018 A | 4/1992 | Dixon | |
| 5,273,195 A | 12/1993 | Cucheran | |
| 5,340,007 A | 8/1994 | Jeuffray et al. | |
| 5,372,287 A | 12/1994 | Deguevara | |
| 5,377,890 A | 1/1995 | Brunner et al. | |

(Continued)

FOREIGN PATENT DOCUMENTS

DE 2939672 4/1981

(Continued)

*Primary Examiner*—Gary E. Elkins
(74) *Attorney, Agent, or Firm*—Harness Dickey & Pierce P.L.C.

(57) ABSTRACT

A vehicle article carrier having a pair of cross bars that can be positioned in a stowed, position, resting on or adjacent to a corresponding pair of side rails, or moved into an operative position with the cross bars extending perpendicularly between the side rails. When the cross bars are in the stowed position, the apparatus presents a significantly more aerodynamic structure that helps to reduce wind noise when the vehicle on which the apparatus is mounted is being driven. The cross bars can be quickly moved into the operative position via a latching mechanism disposed at end that can be released from a securing portion of one side rail and re-attached to a securing portion of the other side rail. Various embodiments are presented with different latching and pivoting mechanisms.

12 Claims, 15 Drawing Sheets

U.S. PATENT DOCUMENTS

| | | |
|---|---|---|
| 5,385,285 A | 1/1995 | Cucheran et al. |
| 5,395,024 A | 3/1995 | Luchtenberg |
| 5,411,196 A | 5/1995 | Lee, Jr. et al. |
| 5,464,140 A | 11/1995 | Hill |
| 5,470,003 A * | 11/1995 | Cucheran ............... 224/316 |
| 5,511,709 A | 4/1996 | Fisch |
| 5,529,231 A | 6/1996 | Burgess |
| 5,549,229 A | 8/1996 | Grabowski |
| 5,577,649 A * | 11/1996 | Lee et al. ............... 224/321 |
| 5,588,572 A | 12/1996 | Cronce et al. |
| 5,624,063 A | 4/1997 | Ireland |
| 5,758,810 A | 6/1998 | Stapleton |
| 5,782,391 A | 7/1998 | Cretcher |
| 5,791,536 A | 8/1998 | Stapleton |
| 5,826,766 A | 10/1998 | Aftanas |
| 5,845,829 A | 12/1998 | Stapleton |
| 5,884,824 A | 3/1999 | Spring, Jr. |
| 6,015,074 A | 1/2000 | Snavely et al. |
| 6,102,265 A | 8/2000 | Stapleton |
| 6,286,739 B1 | 9/2001 | Stapleton |
| 6,409,063 B1 * | 6/2002 | Kmita et al. ............... 224/321 |
| 6,415,970 B1 * | 7/2002 | Kmita et al. ............... 224/326 |
| 6,722,541 B1 * | 4/2004 | Aftanas et al. ............ 224/403 |
| 6,811,066 B1 * | 11/2004 | Aftanas et al. ............ 224/321 |

FOREIGN PATENT DOCUMENTS

| | | |
|---|---|---|
| DE | 2945950 | 5/1981 |
| DE | 3029586 | 3/1982 |
| DE | 3201409 | 9/1983 |
| DE | 3641745 | 6/1988 |
| DE | 3814799 | 11/1988 |
| FR | 2661378 | 10/1991 |
| FR | 2699475 | 6/1994 |
| FR | 2713568 A1 | 6/1995 |
| GB | 2 381 252 | 4/2003 |
| WO | WO 9108929 | 6/1991 |

* cited by examiner

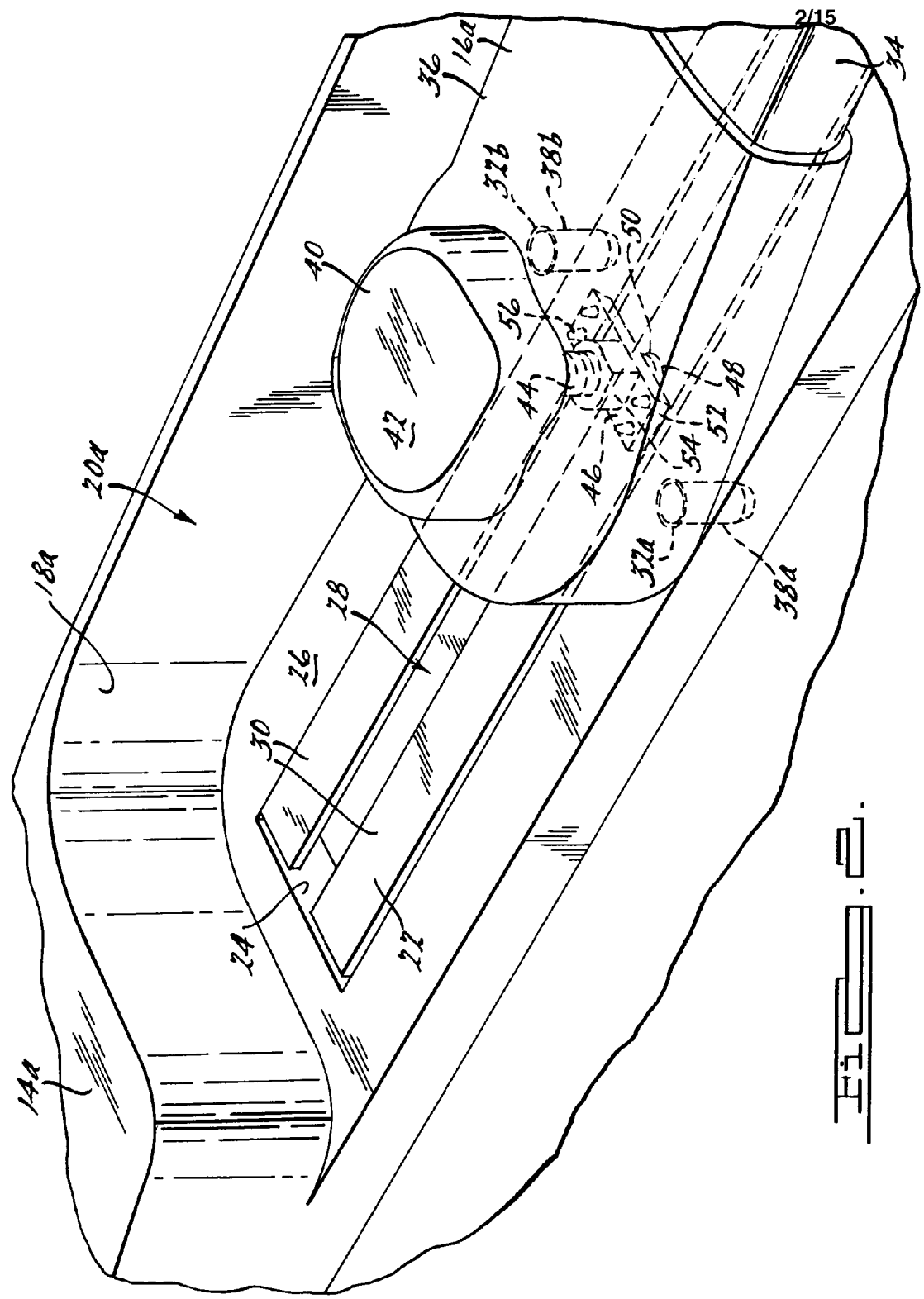

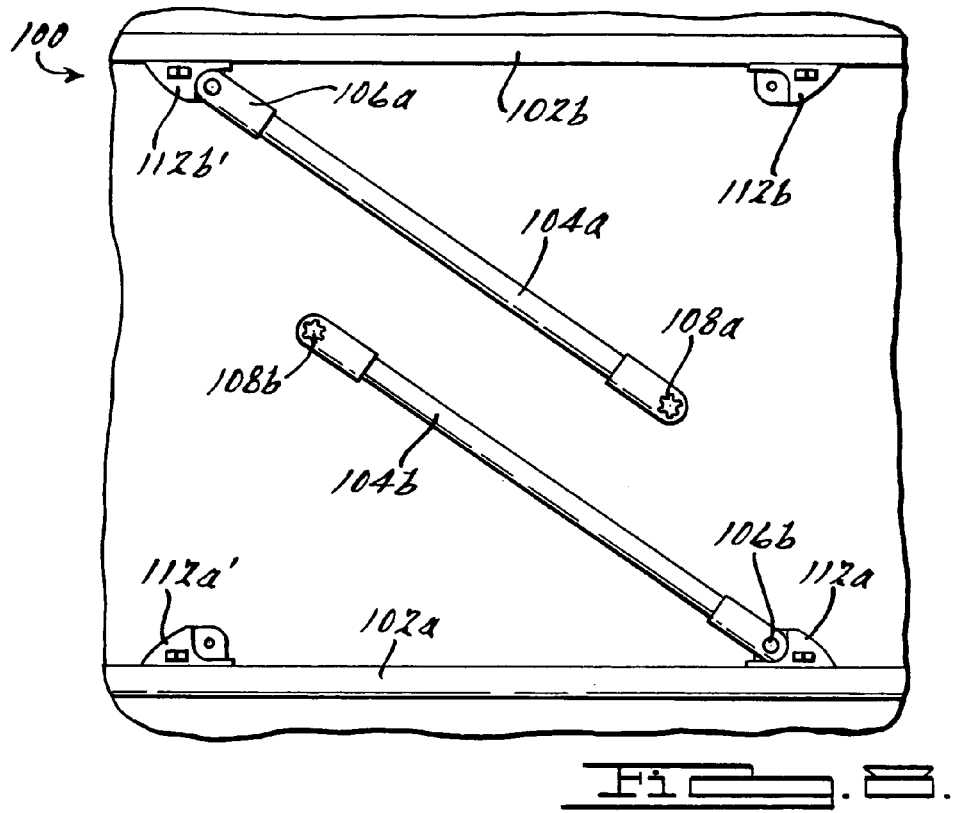
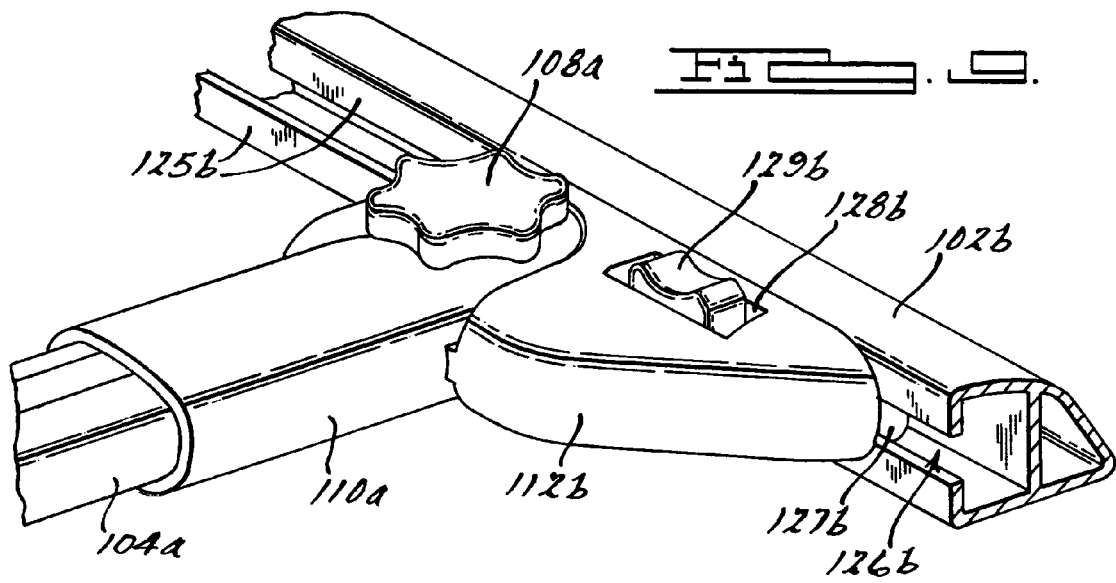

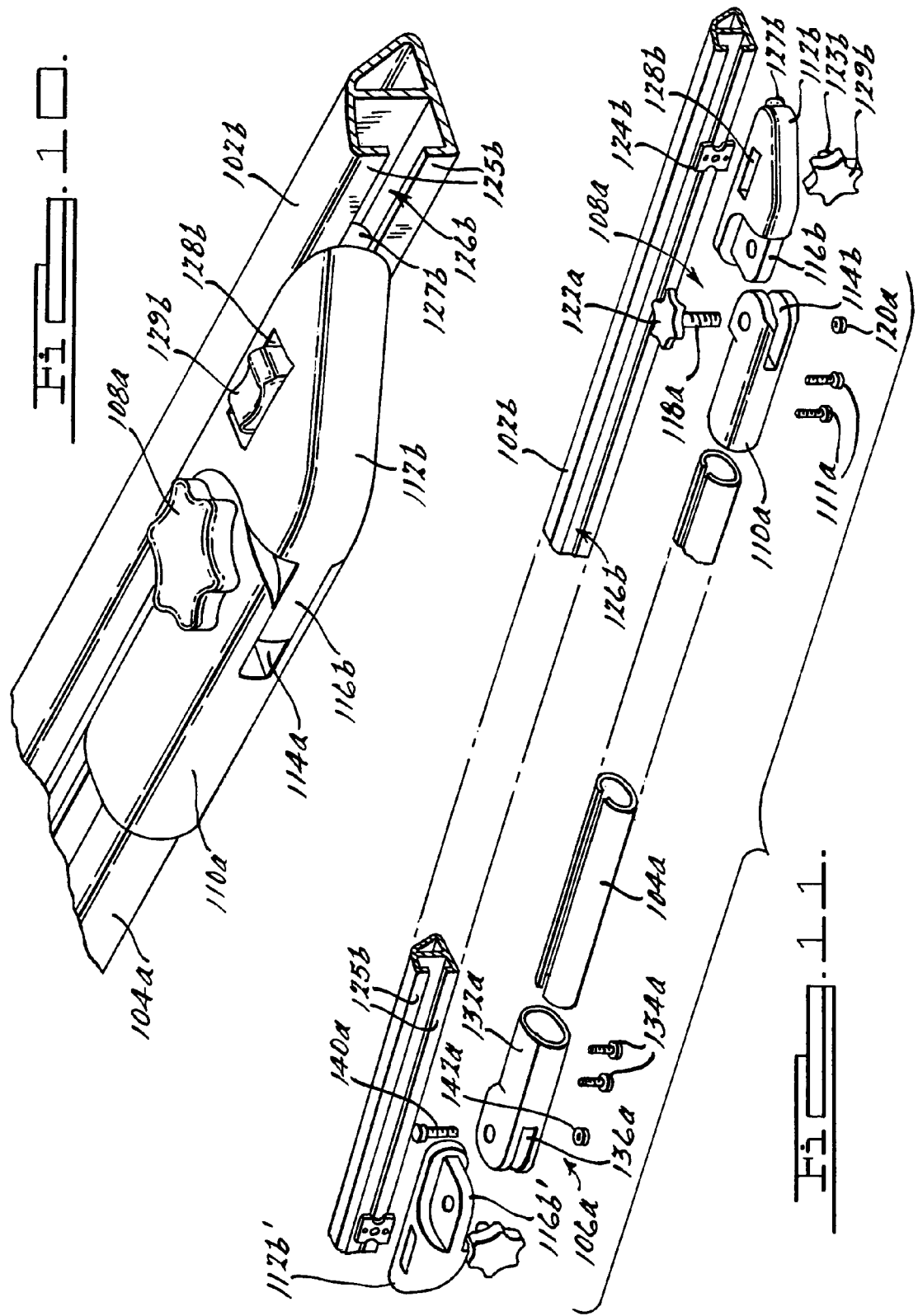

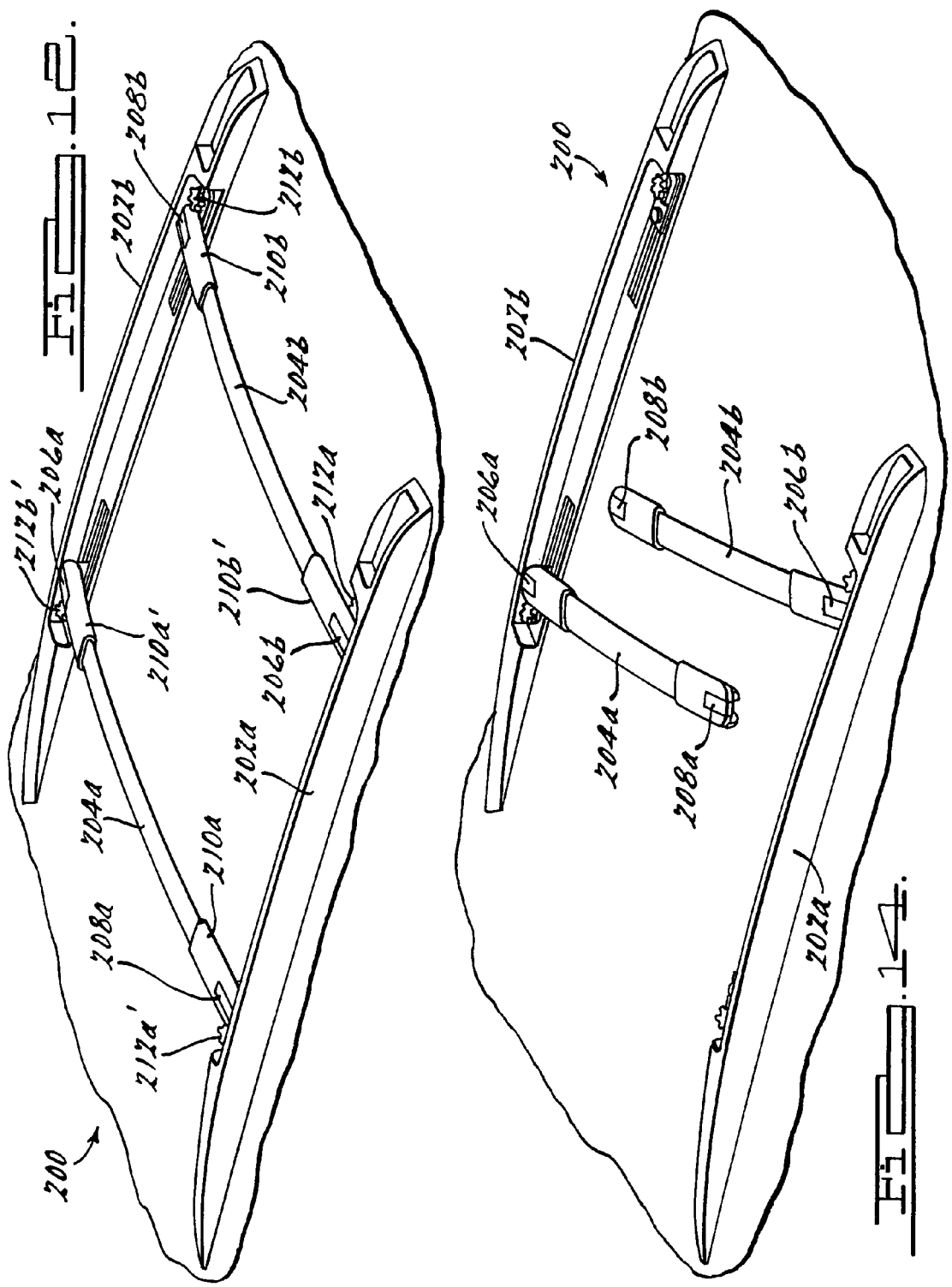

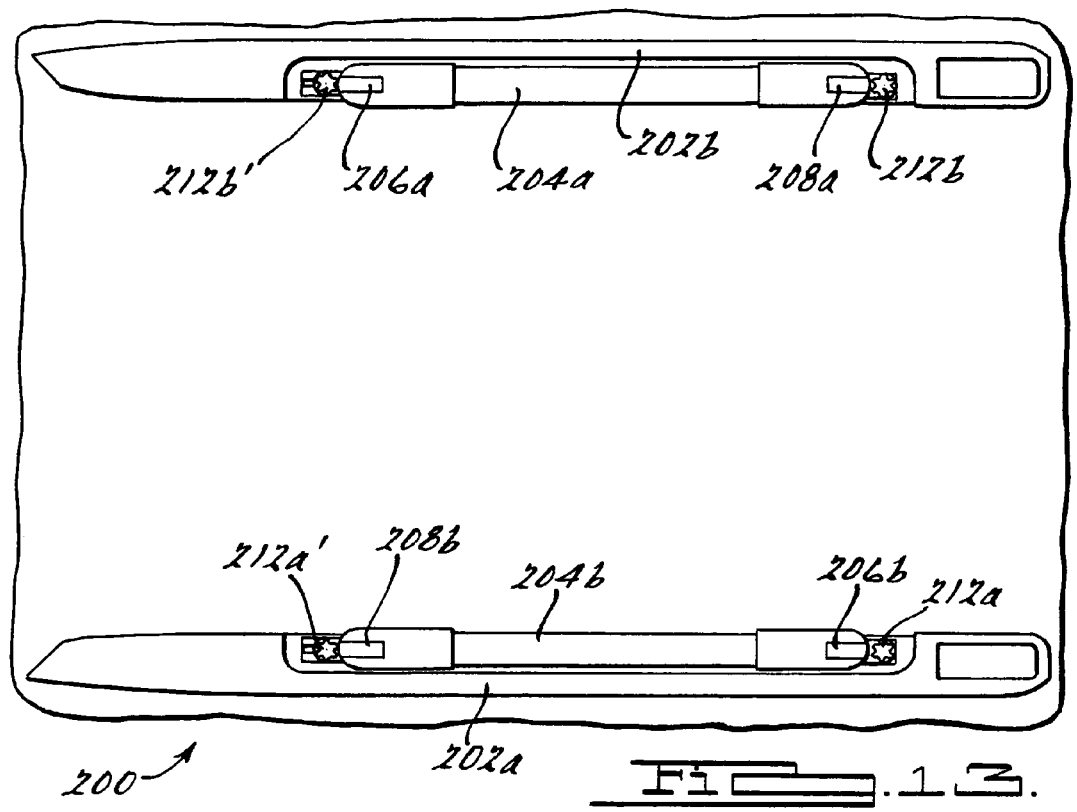
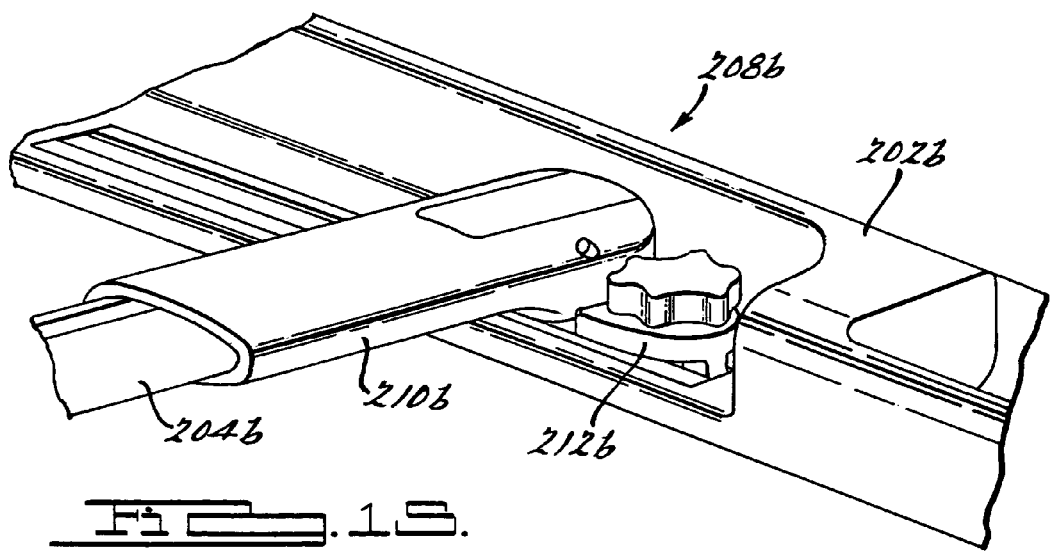

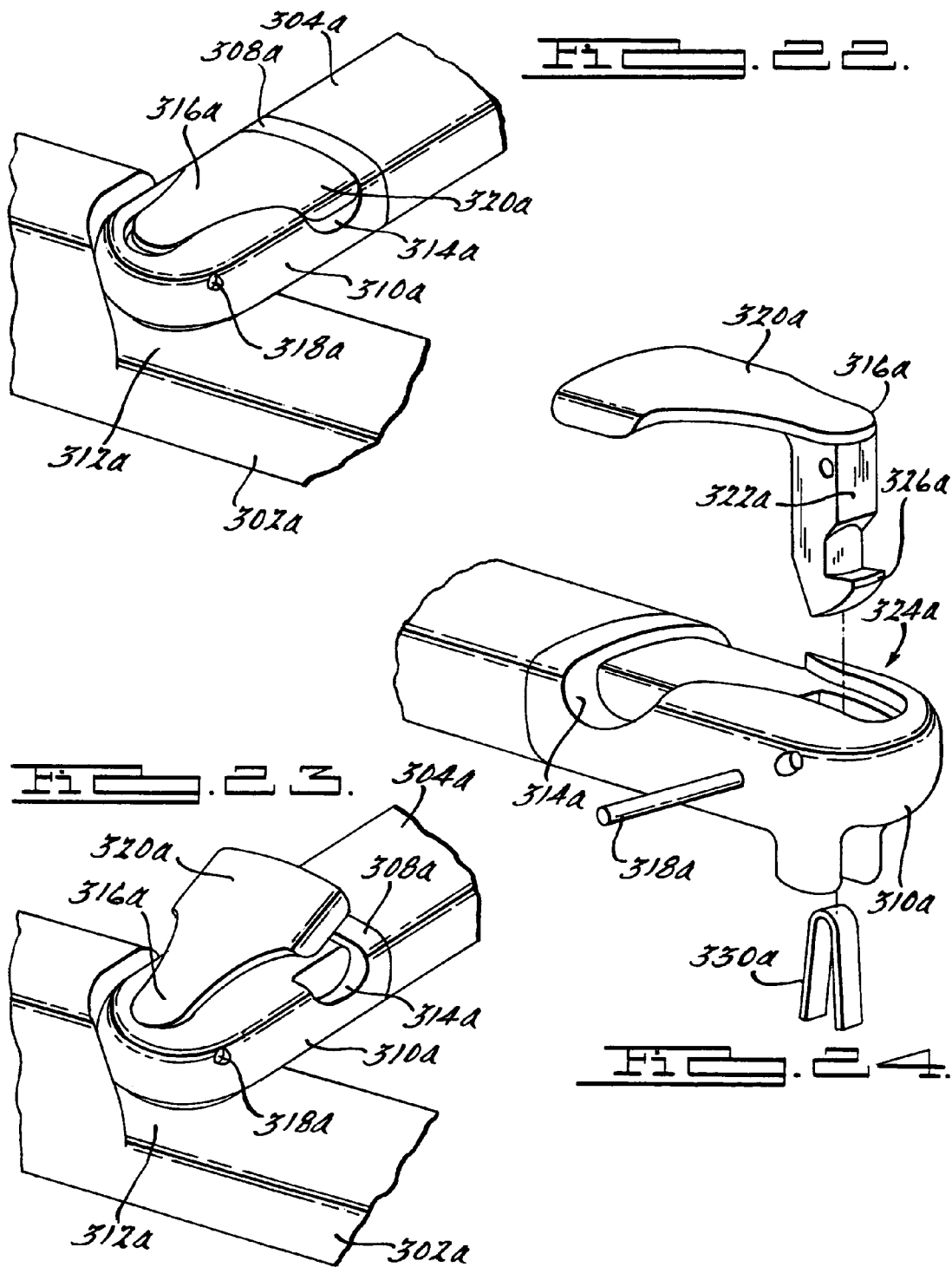

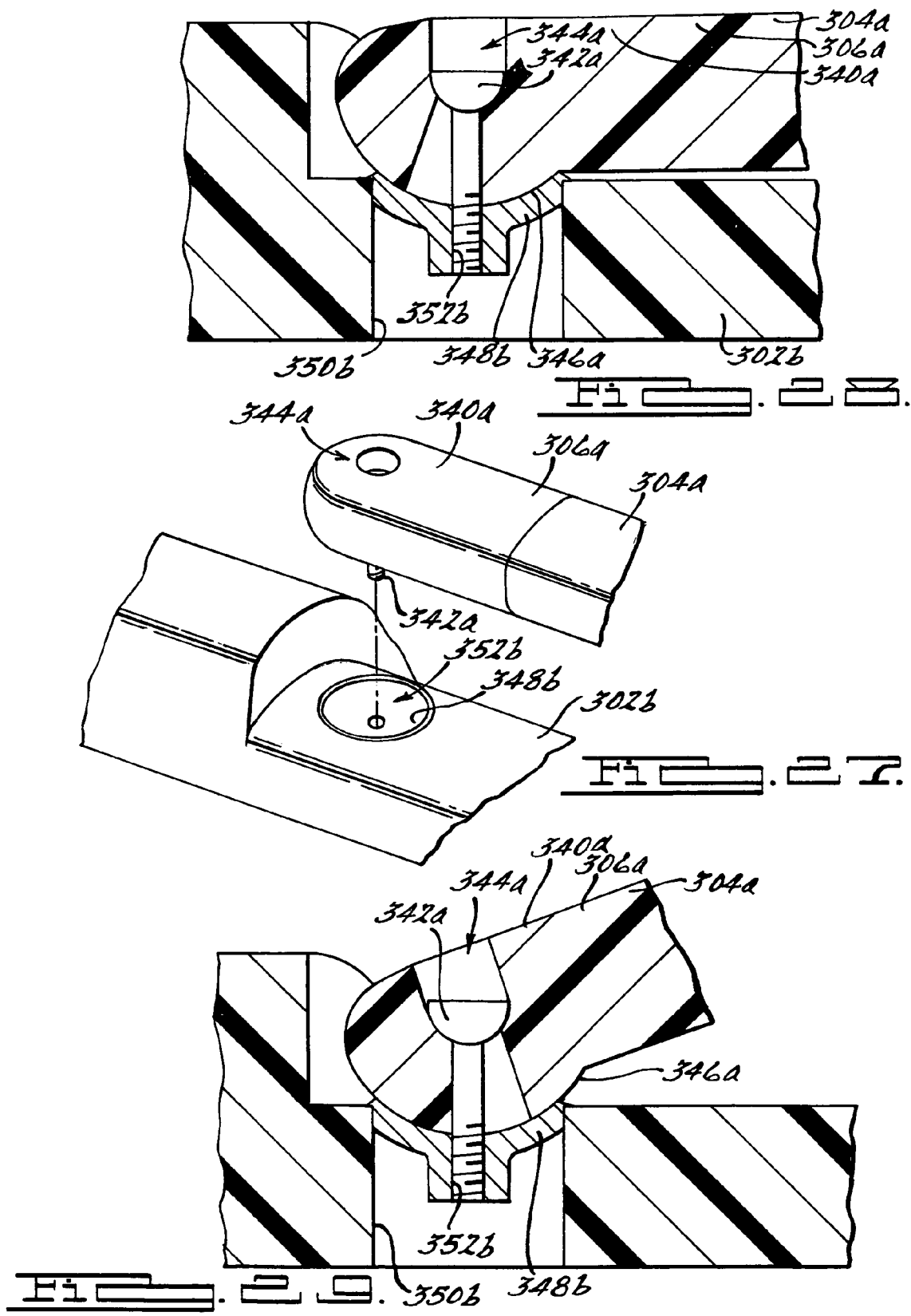

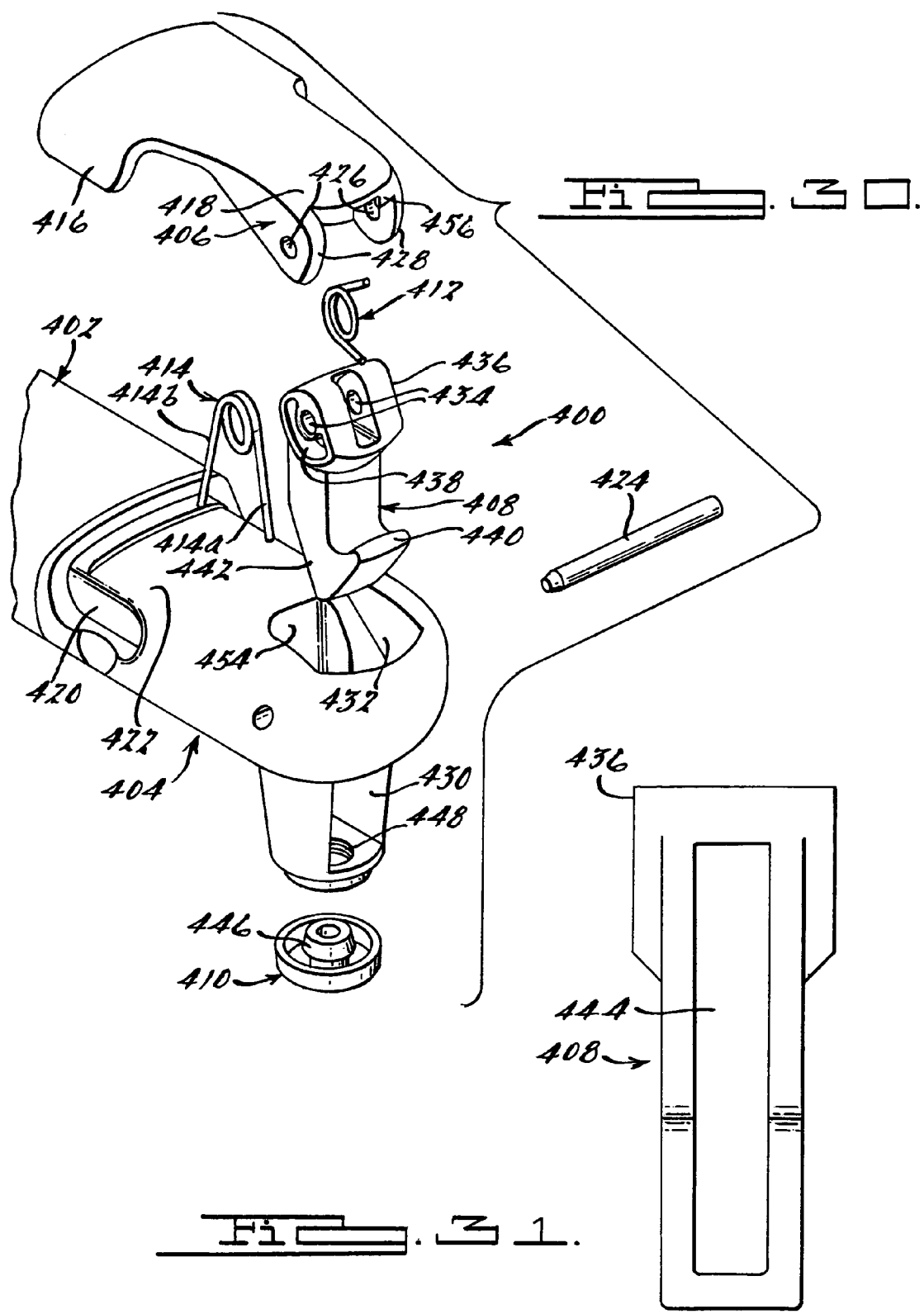

VEHICLE ARTICLE CARRIER HAVING STOWABLE CROSS BARS

CROSS-REFERENCE TO RELATED APPLICATIONS

This application is a continuation-in-part of U.S. Ser. No. 10/279,285, filed Oct. 24, 2002, now U.S. Pat. No. 6,811,066.

BACKGROUND OF THE INVENTION

1. Technical Field

The present invention generally relates to vehicle article carriers such as luggage racks and, more particularly, to a vehicle article carrier having crossbars operable in a first or stowed mode oriented parallel to the longitudinal axis of the vehicle and in a second or article carrying mode oriented perpendicular to the longitudinal axis of the vehicle.

2. Discussion

Modern automotive vehicles are commonly equipped with article carriers such as luggage racks for supporting various articles externally of the vehicle. Most vehicle article carriers include a pair of siderails laterally spaced apart on the vehicle roof (or trunk) and aligned parallel to the longitudinal axis of the vehicle. Most vehicle article carriers also include two or more crossbars laterally spanning the space between the siderails. The crossbars work in conjunction with the siderails to provide anchor points for securing articles to the carrier.

While such vehicle article carriers perform excellently in terms of article support and the like, there is still room for improvement. For example, vehicle article carrier crossbars can sometimes contribute to wind noise audible to vehicle occupants. Inasmuch as wind noise is generally considered undesirable, minimizing wind noise caused by vehicle article carrier crossbars is an important goal.

One attempt to reduce wind noise caused by vehicle article carrier crossbars has been to improve the aerodynamic characteristics of the crossbars. While some of these attempts have proven helpful in reducing wind noise, even more effective wind noise reduction would be highly desirable. Accordingly, there is a need in the art for a vehicle article carrier having an improved crossbar configuration which further minimizes wind noise audible within the vehicle occupant compartment.

SUMMARY OF THE INVENTION

The above and other objects are provided by a vehicle article carrier including a pair of laterally spaced apart siderails. A pair of crossbars are coupled to the siderails. Each crossbar is operable in a first or stowed mode axially aligned with a siderail and in a second or carrying mode laterally spanning the space between the side rails. In a first embodiment, an orientation assembly interengaging the siderails and crossbars ensures that the crossbars are only oriented in one of the first and second modes. That is, the crossbars are not pivotable through orientations between the spanning position and the stowed position. In a second embodiment, the crossbars are pivotable throughout the range of motion between the spanning position and the stowed position. A separate mechanism is also provided to enable the crossbars to be longitudinally repositioned along the siderail. In a third embodiment, the crossbars include a pivoting latch for securing the crossbar to the siderail. This eliminates a rotatable knob provided in the other embodiments. An actuating member helps facilitate the transition between the spanning and stowed modes. In a fourth embodiment, an alternate latch is employed and the crossbar is both horizontally pivotable and vertically rotatable relative to the siderails.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which:

FIG. 2 is a perspective view of a siderail and crossbar assembly according to a first embodiment of the present invention in a stowed mode;

FIG. 8 is a top view of the second embodiment vehicle article carrier in accordance with the present invention pivoting between the spanning and stowed modes;

FIG. 9 is a perspective view of a crossbar and a siderail of the second embodiment vehicle article carrier of the present invention in a spanning mode;

FIG. 10 is a perspective view of a crossbar and a siderail of the second embodiment vehicle article carrier of the present invention in a stowed mode;

FIG. 11 is an exploded perspective view of a crossbar and a siderail of the second embodiment vehicle article carrier of the present invention;

FIG. 12 is a perspective view of a third embodiment vehicle article carrier in accordance with the present invention in a spanning mode;

FIG. 13 is a top view of the third embodiment vehicle article carrier in accordance with the present invention in a stowed mode;

FIG. 14 is a perspective view of the third embodiment vehicle article carrier in accordance with the present invention pivoting between the spanning and stowed modes;

FIG. 15 is a perspective view of a cross bar and siderail of the third embodiment vehicle article carrier of the present invention in a spanning mode;

FIG. 22 is a perspective view of a securing mechanism of the fourth embodiment vehicle article carrier in a locked mode;

FIG. 23 is a perspective view of the securing mechanism of the fourth embodiment vehicle article carrier in an unlocked mode;

FIG. 24 is an exploded view of the securing mechanism of the fourth embodiment vehicle article carrier;

FIG. 27 is a perspective view of a rotating and pivoting mechanism of the fourth embodiment vehicle article carrier;

FIG. 28 is a cross-sectional view of the rotating and pivoting mechanism of the fourth embodiment vehicle article carrier in a non-rotated state;

FIG. 29 is a cross-sectional view of the rotating and pivoting mechanism of the fourth embodiment vehicle article carrier in a rotated state;

FIG. 30 is an exploded perspective view of still another alternative preferred end support for use with the article carrier of the present invention;

FIG. 31 is a view of a rear portion of the latching member shown in FIG. 30;

DETAILED DESCRIPTION OF THE PREFERRED EMBODIMENTS

The following description of the preferred embodiments is merely exemplary in nature and is in no way intended to limit the invention, its application, or uses.

The present invention is directed towards a vehicle article carrier such as a luggage rack. The vehicle article carrier includes a pair of laterally spaced apart siderails. A pair of crossbars are coupled to the siderails and are operable in one of two modes. In a first mode, the crossbars are stowed in axial alignment with the siderails. In a second mode, the crossbars laterally span the space between the siderails.

Figure 1:
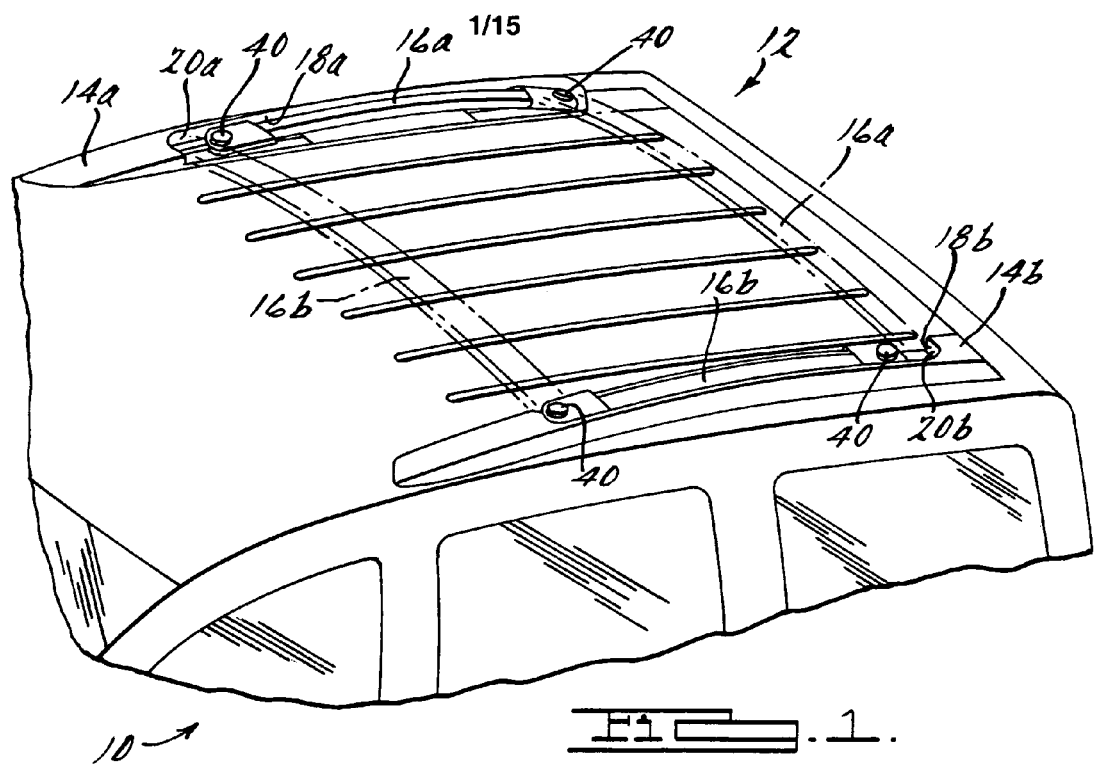
FIG. 1 is a perspective view of a motor vehicle having a vehicle article carrier incorporating the teachings of the present invention mounted thereon.

Turning now to the drawing figures, FIG. 1 illustrates an automotive vehicle in the form of a mini-van generally at 10. A vehicle article carrier 12 is mounted to a roof of the vehicle 10. The vehicle article carrier 12 includes a pair of laterally spaced apart, parallel siderail assemblies 14a and 14b. A pair of crossbar assemblies 16a and 16b are coupled to siderail assemblies 14a and 14b.

Each crossbar assembly 16a, 16b is operable in a first or stowed mode nested within a recessed area 18a, 18b of a siderail assembly 14a, 14b. In the stowed mode, each crossbar assembly 16a, 16b is axially aligned relative to a siderail assembly 14a, 14b. The stowed mode is illustrated in solid lines in FIG. 1.

Each crossbar assembly 16a, 16b is also operable in a second or spanning mode projecting across the space between the siderail assemblies 14a and 14b. In the spanning mode, each crossbar assembly 16a, 16b is laterally aligned relative to the siderail assemblies 14a and 14b. The spanning mode is illustrated in dashed lines in FIG. 1.

To facilitate the transition of the crossbar assemblies 16a and 16b between the stowed mode position and the spanning mode position, gaps 20a and 20b are provided at opposite ends of each recessed area 18a, 18b. The gaps 20a and 20b accommodate one end of a crossbar assembly 16a or 16b in a spanning mode position while the other crossbar assembly 16a or 16b remains in a stowed mode position. In this way, a user may disconnect a stowed crossbar assembly 16a, 16b from one side of the vehicle 10 and reposition it cross-wise to the vehicle without having to walk to the opposite side of the vehicle. The gaps 20a and 20b provide a place for the far end of the crossbar assembly 16a or 16b to rest while the near end is being resecured to the near siderail assembly.

Turning now to FIG. 2, a siderail assembly 14a and crossbar assembly 16a according to a first embodiment are illustrated. While only one end of the siderail assembly 14a and crossbar assembly 16a is illustrated, one skilled in the art should appreciate that the opposite ends thereof are preferably identically configured. Similarly, while only the siderail assembly 14a and crossbar assembly 16a are illustrated, one skilled in the art should appreciate that the other siderail assembly 14b and crossbar assembly 16b are preferably identically configured.

The siderail assembly 14a is preferably formed as an elongated plastic member by a molding process which simultaneously forms the L-shaped recessed area 18a. An elongated metal slat 22 is disposed within a channel 24 formed in the bottom surface 26 of the recessed area 18a. The slat 22 includes an elongated opening in the form of a slot 28. The slot 28 provides access to an interior volume of the slat 22 which is overhung by a pair of opposing lips 30 forming part of the slat 22.

Although the slat 22 may extend along the entire length of the recessed area 18a, it is presently preferred to limit the length or extension to only that amount which is reasonably necessary for mounting anticipated accessories to the siderail assembly 14a. For example, the slat length may be equivalent to five times the width of the end of the crossbar assembly 16a. Although other materials may be used, it is presently preferred to form the slat 22 from extruded aluminum or roll-formed metal.

A pair of laterally spaced apart locating holes 32a and 32b are formed in the bottom surface 26 of the siderail assembly 14a offset from and on opposite sides of the slat 22. The locating holes 32a and 32b are preferably molded in place when the siderail assembly 14a is formed such that an axis interconnecting the holes is essentially orthogonal to the slat 22. If desired, the holes 32a and 32b may alternatively be bored or drilled in place as desired. Also, if desired, a strengthening sleeve, such as a metal cylinder, may be disposed in each locating hole 32a and 32b for added rigidity.

The position of the locating holes 32a and 32b dictate the length of the gap 20a when the crossbar assembly 16a is in a stowed mode position. The gap 20a should be at least long enough to accommodate an end of a crossbar assembly oriented in a spanning mode position while the other crossbar assembly is oriented in a stowed mode position along the same siderail assembly.

The crossbar assembly 16a is preferably formed by a molding process to include an elongated plastic crossbar body 34. The crossbar assembly 16a also includes an end support 36 mounted to and end of the crossbar body 34. The end support 36 is also preferably formed as a plastic member by a molding process.

The end support 36 includes a pair of spaced apart locating pegs 38a and 38b extending essentially orthogonally from a mounting surface side thereof. The locating pegs 38a and 38b are preferably molded in place so as to be integral with the end support 36 but may alternatively be secured to the end support 36 as discrete members. The locating pegs 38a and 38b are configured to complement the size, shape, spacing and angle of the locating holes 32a and 32b. As such, the locating pegs 38a and 38b may be removeably inserted within the locating holes 32a and 32b. In this way, the locating pegs 38a and 38b cooperate with the locating holes 32a and 32b to form part of an orientation assembly for orienting the crossbar assembly 16a in the first or stowed mode.

A locking assembly 40 coupled to the crossbar assembly 16a includes a preferably plastic rotatable knob 42 coupled to a preferably metallic threaded member 44 which extends through an opening formed through the end support 36. The threaded member 44 threadingly engages an auto-aligning locking member 46 in the form of a preferably metallic, e.g., aluminum, stamped tap plate or T-lug. As will be described in greater detail below, by rotating the rotatable knob 42 to tighten the threaded member 44 into the locking member 46, the locking member 46 abuttingly engages the underside of the lips 30 of the slat 22 to lock the crossbar assembly 16a to the siderail assembly 14a. By rotating the rotatable knob 42 to loosen the threaded member 44 from the locking member 46, the locking member 46 disengages the lips 30 of the slat 22 and aligns along the axis of the slot 28 to unlock the crossbar assembly 16a from the siderail assembly 14a.

The distal end 48 of the threaded member 44 includes an unsettled thread area 50 to prevent the threaded member 44 from disconnecting from the locking member 46. That is, as relative rotation between the threaded member 44 and locking member 46 occurs, the locking member 46 may migrate toward the distal end 48 of the threaded member 44. However, when the locking member 46 reaches the unsettled thread area 50, the locking member 46 cannot migrate further or inadvertently be twisted off of the threaded member 44.

Figure 3:
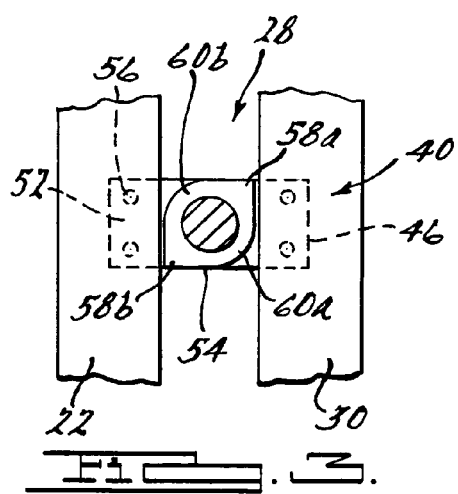
FIG. 3 is a top view of the locking member of the crossbar assembly of the first embodiment of the present invention in a locked mode.
Figure 4:
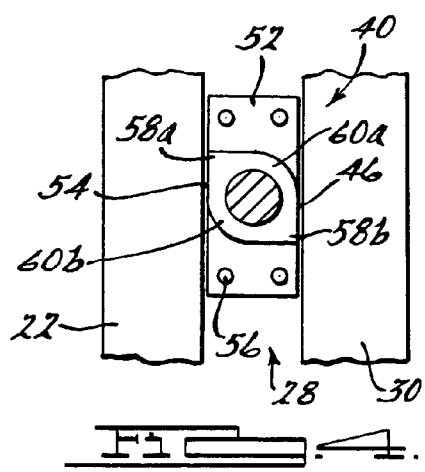
FIG. 4 is a top view of the locking member of the crossbar assembly of the first embodiment of the present invention in an unlocked mode.

Turning now to FIGS. 3 and 4 (and also with continued reference to FIG. 2), the operation of the locking assembly 40 will be described in greater detail. The locking member 46 includes a rectangular base portion 52 having an upstanding orientation portion or collar 54 extending therefrom. The base portion 52 has a width which is less than the width of the slot 28 between the lips 30 of the slat 22. The base portion 52 has a length which is longer than the width of the slot 28. In this way, the locking member 46 can be inserted within the slot 28 and then rotated 90° to underlie the lips 30 and lock in place.

A plurality of conical members or teeth 56 upwardly projecting from the base portion 52 frictionally engage the lips 30 of the slat 22 to prevent relative rotation therebetween. The teeth 56 may be cast in place, machined, or formed by bending up the corners of the base portion 52.

The vertical position of the locking member 46 along the threaded member 44 is controlled such that the orientation portion 54 spans the depth of the slot 28. That is, when the locking member 46 is disposed within the slat 22, the lips 30 of the slat 22 remain adjacent the orientation portion 54. In this way, the orientation portion 54 can interact with the slat 22 to control the orientation of the base portion 52.

More particularly, the orientation portion 54 includes two stops in the form of two oppositely disposed engagement corners 58a and 58b. The orientation portion 54 also includes two oppositely disposed rotation-enabling rounds 60a and 60b. The rounds 60a and 60b allow the locking member 46 to be rotated relative to the slat 22. However, the corners 58a and 58b prevent the locking member 46 from rotating more than 90°. More particularly, during rotation of the threaded member 44, the rounds 60a and 60b rotate relative to the lips 30 of the slat 22. However, at the end of a 90° arc, the engagement corners 58a and 58b abuttingly engage the lips 30. As such, further rotation of the locking member 46 is prevented.

As can be appreciated from the forgoing, the locking member 46 may be easily rotated to a first or engagement position oriented orthogonally relative to the lips 30 or to a second or release position oriented parallel to the lips 30. In the engagement position, the crossbar assembly 16a is locked to the siderail assembly 14a. In the release position, the crossbar assembly 16a is removable from the siderail assembly 14a. After the locking member 46 is released, the crossbar assembly 16a may be lifted from the siderail assembly 14a and repositioned relative thereto.

Figure 5:
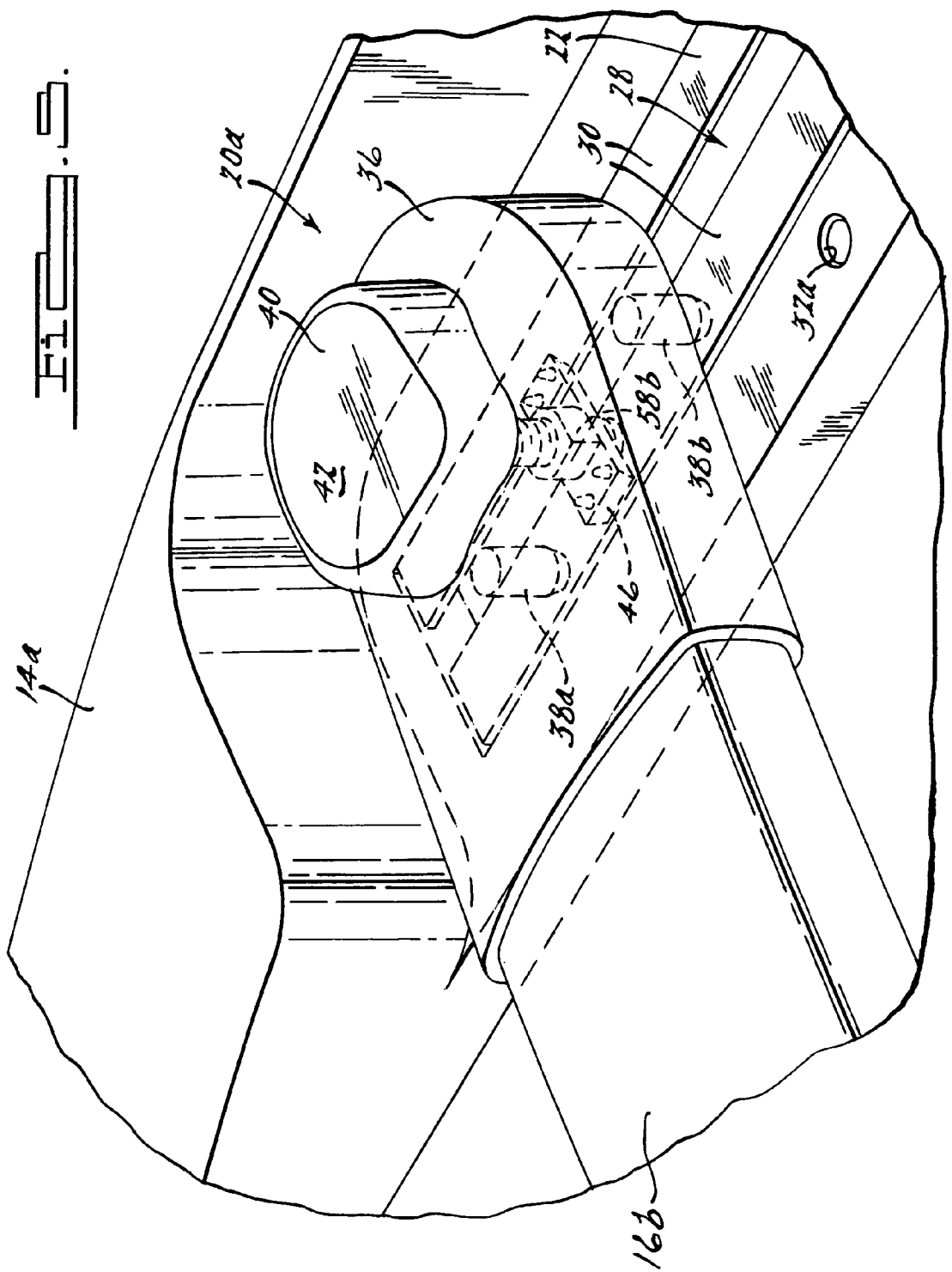
FIG. 5 is a perspective view of the first embodiment siderail and crossbar assembly in a spanning mode.

Turning now to FIG. 5, the crossbar assembly 16b is illustrated in a second or spanning mode relative to the siderail assembly 14a. As illustrated, the end support 36 of the crossbar assembly 16b rests within the gap 20a. Of course, once the other cross bar assembly is removed from the siderail assembly 14a, the spanning crossbar assembly 16b can be positioned anywhere along the length of the slat 22.

In the second or spanning mode, the locating pegs 38a and 38b are inserted within the slot 28 of the slat 22. More particularly, the pegs 38a and 38b are removed from the locating holes 32a and 32b and reoriented 90° relative thereto. The abutting engagement of the pegs 38a and 38b with the lips 30 of the slat 22 maintain the angle of the crossbar assembly 16b relative to the siderail assembly 14a. In this way, the slat 22 cooperates with the locating pegs 38a and 38b to form part of the orientation assembly for orienting the crossbar assembly 16b in the second or spanning mode.

Although it should be clear from the foregoing description, the transition of the crossbar assembly 16b from a stowed mode to a spanning mode and vice versa will be described with reference to FIGS. 1–5. In the stowed mode, the locking assemblies 40 will normally be locked to secure the crossbar assembly 16b to the siderail assembly 14b. The rotatable knob 42 is then rotated in a counter-clockwise direction to loosen the locking member 46 from the lips 30 of the slat 22. Continued counter-clockwise rotation twists the locking member 46 90° from the locked position under the lips 30 to the unlocked position aligned with the slot 28. Abutment of the engagement corners 58a and 58b of the orientation portion 54 with the lips 30 prevents over rotation of the locking member 46.

Once both locking assemblies 40 are unlocked, the crossbar assembly 16b may be lifted away from the siderail assembly 14b and reoriented cross-wise relative thereto. The far end of the crossbar assembly 16b may then be positioned within the gap 20a of the opposite siderail assembly 14a. Simultaneously or thereafter, the near end of the crossbar assembly 16b can be positioned such that the locking member 46 and locating pegs 38a and 38b are inserted within the slot 28. Slight repositioning of the locking member 46 may be performed by manipulation of the rotatable knob 42 if required.

Once the locking member 46 and locating pegs 38a and 38b are properly positioned, the rotatable knob 42 is rotated in a clockwise direction to twist the locking member 46 to an engagement position as controlled by the interaction of engagement corners 58a and 58b with the lips 30. Continued clockwise rotation of the rotatable knob 42 secures the locking member 46 under the lips 30 and locks the crossbar assembly 16b to the siderail assembly 14b.

A similar operation is performed to secure the opposite end of the crossbar assembly 16b to the opposite siderail assembly 14a. To return the crossbar assembly 16b to the stowed mode position, the opposite sequence is performed.

Figure 6:
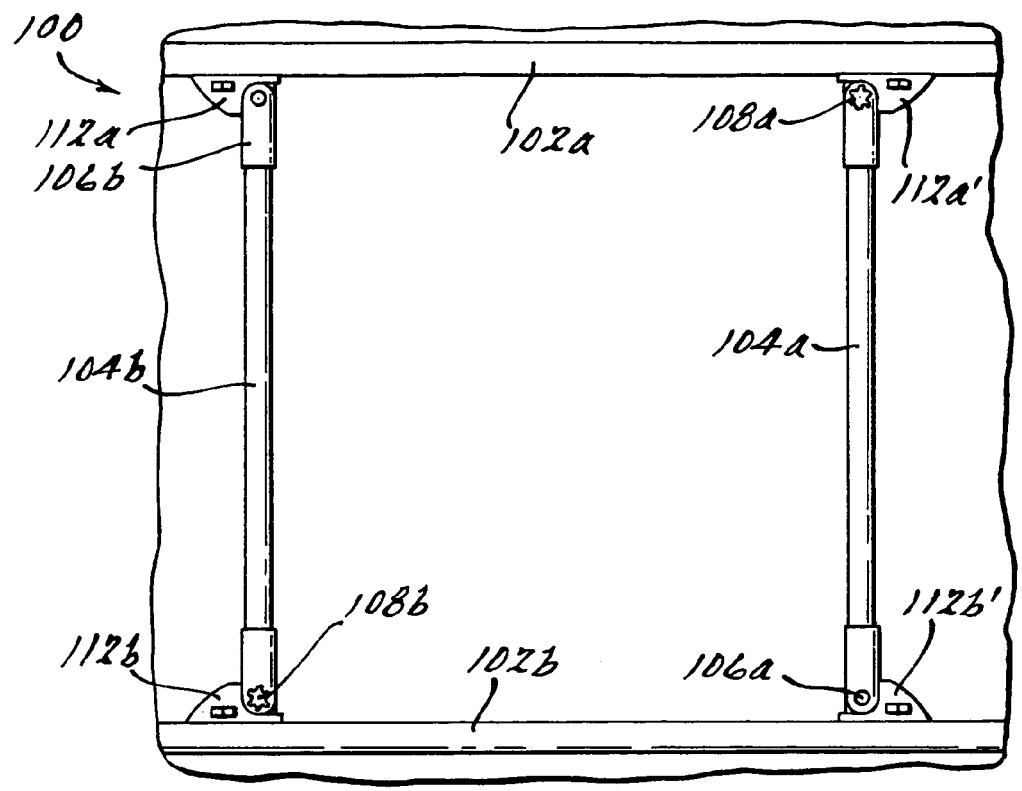
FIG. 6 is a top view of a second embodiment vehicle article carrier in accordance with the present invention in a spanning mode.
Figure 7:
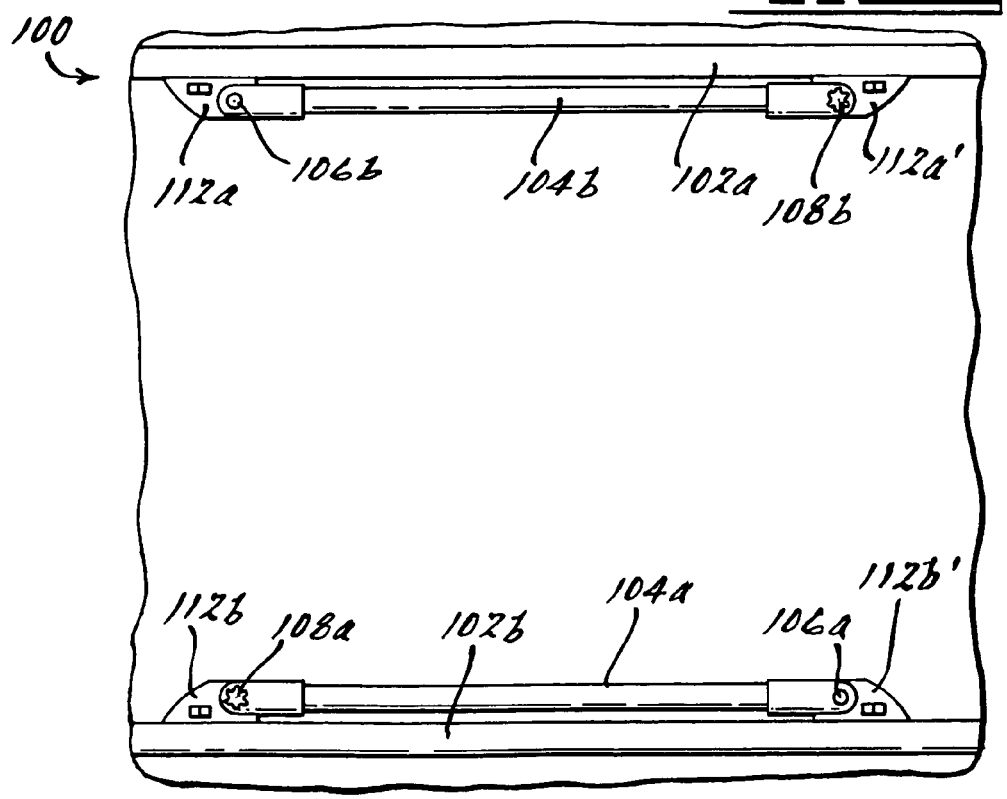
FIG. 7 is a top view of the second embodiment vehicle article carrier in accordance with the present invention in a stowed mode.

Turning now to FIGS. 6–8, a second embodiment of the present invention is illustrated. The vehicle article carrier 100 includes two laterally spaced apart siderails 102a and 102b. A pair of crossbars 104a and 104b are coupled at opposite ends to the siderails 102a and 102b. The crossbars 104a and 104b are operable in a first or spanning mode, as illustrated in FIG. 6, extending across the space between the siderails 102a and 102b, and also in a second or stowed mode, as illustrated in FIG. 7, axially aligned with the siderails 102a and 102b.

As illustrated in FIG. 8, to facilitate the transition between the spanning mode and the stowed mode, the crossbars 104a and 104b are pivotally coupled at one end to the siderails 102a and 102b. More particularly, the crossbar 104a includes a pivot mechanism 106a pivotally coupled to the siderail 102b. Similarly, the crossbar 104b includes a pivot mechanism 106b pivotally coupled to the siderail 102a.

A securing mechanism 108a is provided at the opposite end of the crossbar 104a for securing the crossbar 104a to the siderail 102b in a stowed mode (see FIG. 7) and to the siderail 102a in a spanning mode (see FIG. 6). Similarly, a securing mechanism 108b is provided at the opposite end of the crossbar 104b for securing the crossbar 104b to the siderail 102a in a stowed mode (see FIG. 7) and to the siderail 102b in a spanning mode (see FIG. 6). An exemplary securing mechanism 108a is illustrated in greater detail in FIGS. 9–11.

As shown in FIGS. 9–11, the securing mechanism 108a interconnects a shroud 110a of the crossbar 104a with a moveable mount 112b secured to the siderail 102b. The shroud 110a is secured to the crossbar 104a by at least one fixing member 111a preferably in the form of a screw. The shroud 110a includes a slotted opening 114a providing a pair of spaced apart shroud arms for sandwiching a tab 116b of the moveable mount 112b therebetween. A fastening member preferably in the form of a threaded shaft 118a passes through the shroud 110a and tab 116b to secure the two together. A retention member preferably in the form of a threaded nut 120a engages the threaded shaft 118a to fix the crossbar 104a to the siderail 102b. A knob 122a formed at an opposite end of the threaded shaft 118a relative to the nut 120a facilitates turning of the threaded shaft 118a to tighten or loosen the connection with the threaded nut 120a. Preferably, the nut 120a is fixedly secured to the shroud 110a so as to remain coupled to the shroud 110a even after the shaft 118a is disengaged. In this way, the shaft 118a can be easily engaged and disengaged from the nut 120a before and after pivoting the crossbar 104a between the stowed and spanning positions. Although not illustrated, one skilled in the art will appreciate that the securing mechanism 108b is preferably configured identically to the securing mechanism 108a.

The moveable mount 112b is preferably slideably secured to the siderail 102b. More particularly, a fixing member in the form of a threaded shaft 123b selectively secures the moveable mount 112b along the siderail 102b. An anchor in the form of a tapped plate 124b threadingly engages the threaded shaft 123b and frictionally engages an inner surface of a pair of opposed lips 125b defining an elongated slot 126b in the siderail 102b. A T-shaped lug 127b is preferably integrally provided along an edge of the moveable mount 112b to slidingly accommodate the lips 125b while residing within the slot 126b. An orifice 128b provided in the interior of the moveable mount 112b accommodates a knob 129b affixed to the threaded shaft 123b opposite the tapped plate 124b. By turning the knob 129b, the threaded shaft 123b releases the frictional engagement of the tapped plate 124b with the lips 125b thereby enabling sliding movement of the moveable mount 112b along the siderail 102b.

Another moveable mount 112b' is also slideably secured to the siderail 102b. The moveable mount 112b' is preferably configured identical to that of the moveable mount 112b. Similarly, as illustrated in FIGS. 6–8, two moveable mounts 112a and 112a' are slideably secured to the siderail 102a. The moveable mounts 112a and 112a' are preferably configured identical to that of the moveable mounts 112b and 112b'. By providing the moveable mounts 112, the crossbars 104a and 104b can be selectively positioned along the siderails 102a and 102b while in the spanning mode.

A pivoting mechanism 106a interconnects a shroud 132a of the crossbar 104a with the moveable mount 112b' secured to the siderail 102b. The shroud 132a is secured to the crossbar 104a by at least one fixing member 134a in the form of a screw. The shroud 132a includes a slotted opening 136a providing a pair of shroud arms for sandwiching a tab 116b' of the moveable mount 112b' therein. A pivot member in the form of a partially threaded shaft 140a passes through the shroud 132a and tab 116b' to secure the two together. A threaded nut 142a engages the threaded shaft 140a to fix the two in place. Although not illustrated, one skilled in the art will appreciate that the pivoting mechanism 106b is preferably configured identically to the pivoting mechanism 106a.

Turning now to FIGS. 12–14 a third embodiment of the present invention is illustrated. The vehicle article carrier 200 includes two laterally spaced apart siderails 202a and 202b. A pair of crossbars 204a and 204b are coupled at opposite ends to the siderails 202a and 202b. The crossbars 204a and 204b are operable in a first or spanning mode, as illustrated in FIG. 12, extending across the space between the siderails 202a and 202b, and also in a second or stowed mode, as illustrated in FIG. 13, axially aligned with the siderails 202a and 202b.

As illustrated in FIG. 14, to facilitate the transition between the spanning mode and the stowed mode, the crossbars 204a and 204b are pivotally coupled to the siderails 202a and 202b. More particularly, the crossbar 204a includes a pivoting latch mechanism 206a pivotally coupled to the siderail 202b. Similarly, the crossbar 204b includes a pivoting latch mechanism 206b pivotally coupled to the siderail 202a.

Figure 16:
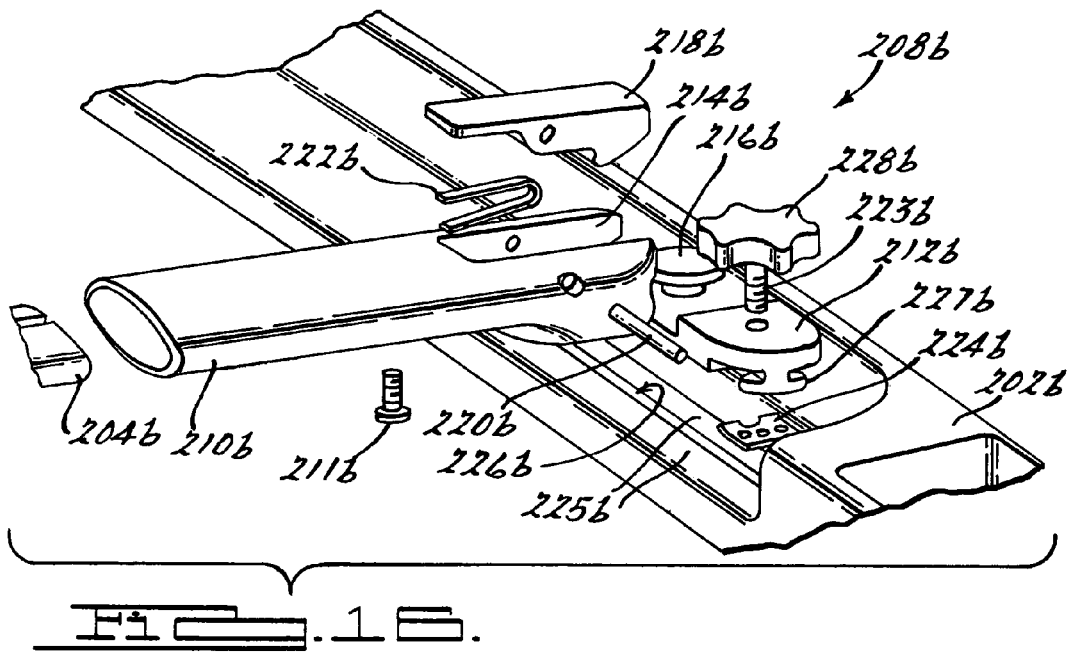
FIG. 16 is an exploded perspective view of a cross bar and siderail of the third embodiment vehicle article carrier of the present invention.

A securing mechanism 208a is provided at the opposite end of the crossbar 204a relative to the pivoting latch mechanism 206a for securing the crossbar 204a to the siderail 202b in a stowed mode (see FIG. 13) and to the siderail 202a in a spanning mode (see FIG. 12). Similarly, a securing mechanism 208b is provided at the opposite end of the crossbar 204b relative to the pivoting latch mechanism 206b for securing the crossbar 204b to the siderail 202a in a stowed mode (see FIG. 13) and to the siderail 202b in a spanning mode (see FIG. 12). An exemplary securing mechanism 208b is illustrated in greater detail in FIGS. 15–16

Figure 17:
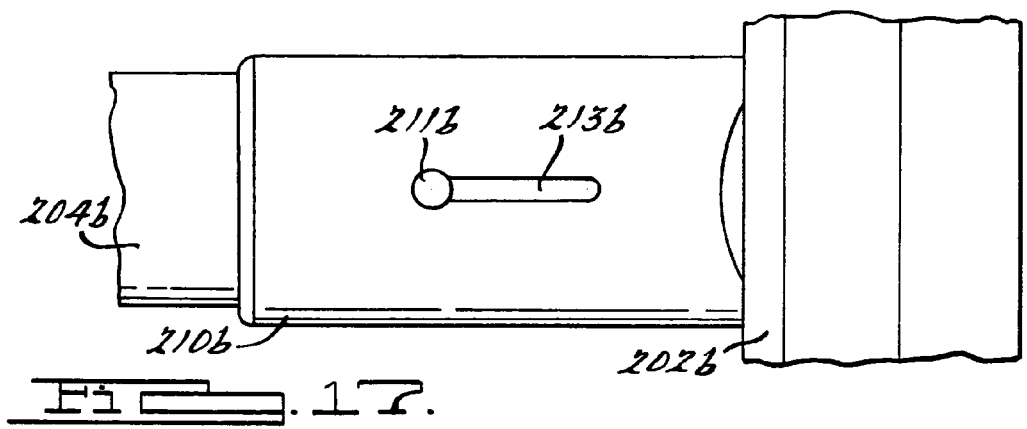
FIG. 17 is a bottom view of a cross bar and siderail of the third embodiment vehicle article carrier of the present invention in an extended mode.
Figure 18:
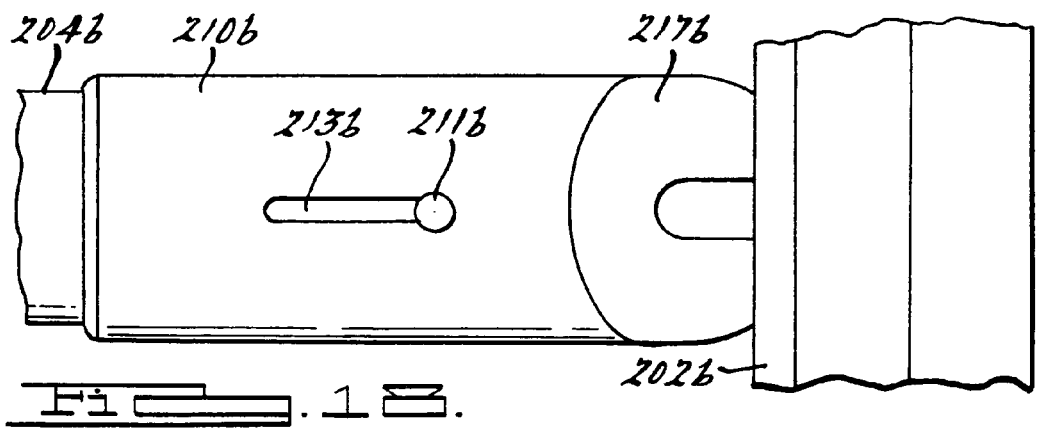
FIG. 18 is a bottom view of a cross bar and siderail of the third embodiment vehicle article carrier of the present invention in a retracted mode.

As shown in FIGS. 15–18, the securing mechanism 208b interconnects an end support shroud 210b of the crossbar 204b with a moveable mount 212b secured within a recess of the siderail 202b. The end support 210b is secured to the crossbar 204b in a telescoping manner by at least one fixing member 211b in the form of a screw. The fixing member 211b is fixed relative to the crossbar 204b but the end support 210b is moveable relative to both the fixing member 211b and the crossbar 204b. As such, the end support 210b can be translated between an extended or engaged mode, as illustrated in FIG. 17, and a retracted or disengaged mode, as illustrated in FIG. 18. A slot 213b formed in the end support 210b accommodates such movement.

The end support 210b includes a slotted opening 214b for enveloping a mushroom-shaped nub 216b of the moveable mount 212b therein. A base 217b of the end support 210b slides under the top and on either side of the trunk of the mushroom-shaped nub 216b while the walls of the shroud adjacent the opening 214b abut the sides of the nub 216b. A fastening member in the form of a pivotable latch 218b pivotally resides within the slotted opening 214b and is operable in a locked mode to engage the nub 216b and an unlocked mode to release the nub 216b. An axle 220b secures the latch 218b to the end support 210b and serves as a pivot for the latch 218b. A biasing member in the form of a spring clip 222b nests within the opening 214b and urges the latch 218b toward the locked mode. To disengage the latch 218b from the nub 216b, the bias of the spring 222b is overcome by depressing the inboard end of the latch which allows the outboard end of the latch to lift off and release the nub 216b. Once released from the nub 216b, the shroud may be translated away from the nub 216b to provide clearance for the cross bar 204b to pivot.

Figure 19:
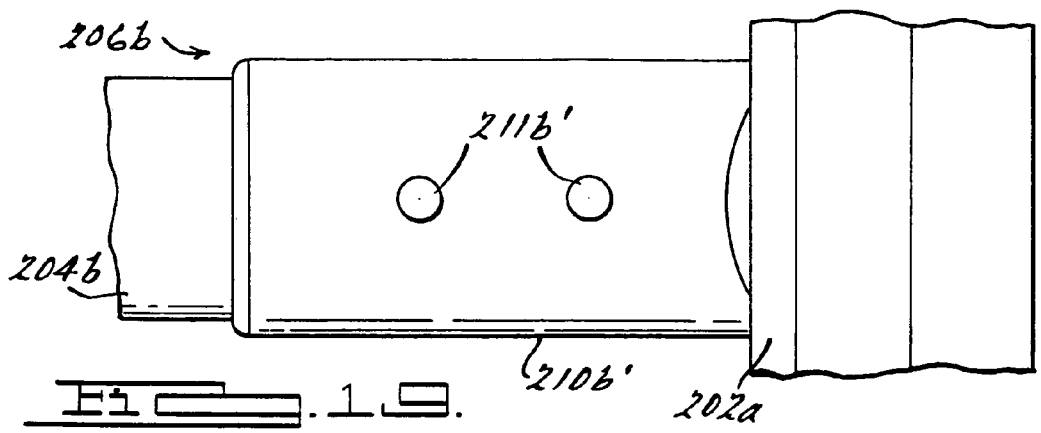
FIG. 19 is a bottom view of a cross bar and siderail of the third embodiment vehicle article carrier of the present invention.

One skilled in the art will appreciate that the securing mechanism 208a is preferably configured identically to the securing mechanism 208b. Similarly, The securing mechanisms 206a and 206b are preferably configured identically to the securing mechanisms 208a and 208b with the exception of the translatable end support. Referring to FIG. 19, the securing mechanism 206b is illustrated. The end support 210b' is fixedly secured to the crossbar 204b by at least one fixing member 211b' in the form of a screw. No slot is provided in the end support 210b'. In this way, the crossbar 204b is provided with one fixed end support 210b' and one translatable end support 210b (See FIGS. 17 and 18). Likewise, the crossbar 204a is provided with one fixed end support 210a' and one translatable end support 210a (see FIG. 12).

Referring again to FIGS. 15 and 16, the moveable mount 212b is preferably slideably secured to the siderail 202b. More particularly, a fixing member in the form of a threaded shaft 223b selectively secures the moveable mount 212b along the siderail 202b. An anchor in the form of a tapped plate 224b threadingly engages the threaded shaft 223b and frictionally engages an inner surface of a pair of opposed lips 225b defining an elongated slot 226b in the siderail 202b. A t-shaped lug 227b is preferably integrally provided along an edge of the moveable mount 212b to slidingly accommodate the lips 225b while residing within the slot 226b. A knob 228b is provided on the threaded shaft 223b opposite the tapped plate 224b. By turning the knob 228b, the threaded shaft 223b releases the frictional engagement of the tapped plate 224b with the lips 225b thereby enabling sliding movement of the moveable mount 212b along the siderail 202b.

Referring again to FIGS. 12–14, another moveable mount 212b' is also slideably secured to the siderail 202b. The moveable mount 212b' is preferably configured identically to the moveable mount 212b. Similarly, two moveable mounts 212a and 212a' are slideably secured to the siderail 202a. The moveable mounts 212a and 212a' are preferably configured identically to the moveable mounts 212b and 212b'. By providing the moveable mounts 212, the crossbars 204a and 204b can be selectively positioned along the siderails 202a and 202b while in the spanning mode.

Referring collectively to FIGS. 12–19, to reposition the crossbars from a stowed mode to a spanning mode, one securing mechanism 208 of each crossbar is disengaged from a nub and each cross bar is pivoted towards the spanning position about the opposite securing mechanism 206. Each crossbar 204 is also translated such that the end of each crossbar 204 is laterally offset from a nub 216 yet essentially perpendicular to the siderails 202. To accommodate the translation movement, one end support 210 telescopically retracts onto each crossbar 204. The securing mechanism 208 of each crossbar 204 is then positioned adjacent to a nub 216, the crossbar is translated in an opposite direction to move the securing mechanism 208 over top of the nub 216, and subsequently secured thereto with a latch 218

Figure 20:
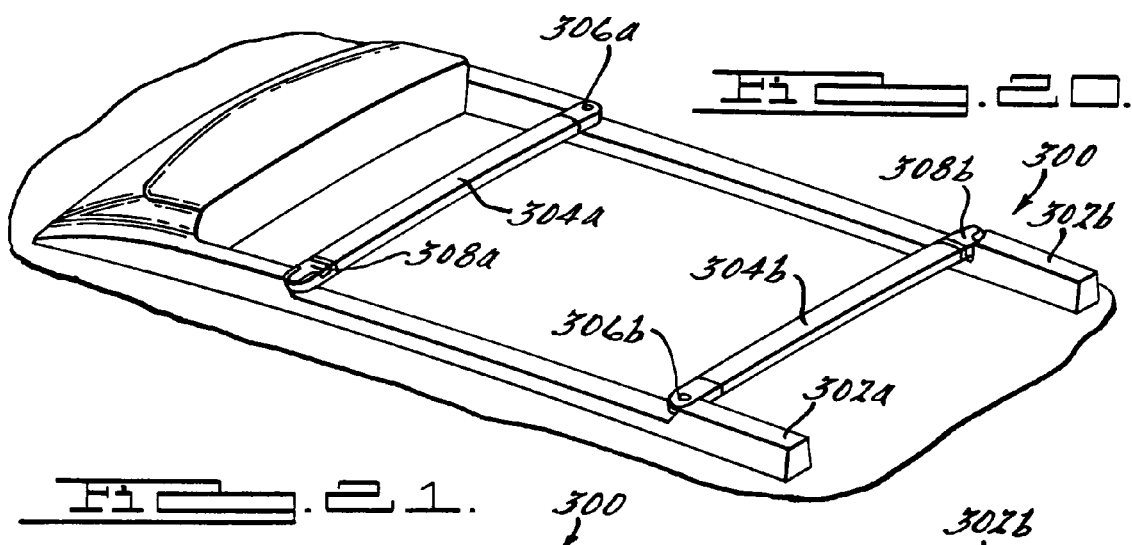
FIG. 20 is a perspective view of a fourth embodiment vehicle article carrier in accordance with the present invention in a spanning mode.
Figure 21:
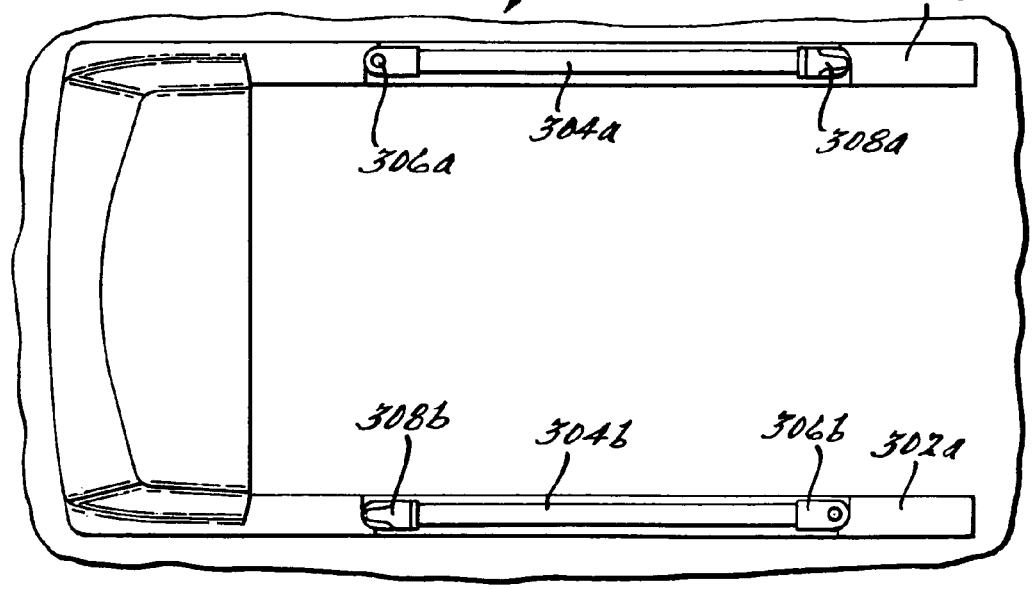
FIG. 21 is a top view of the fourth embodiment vehicle article carrier in a stowed mode.
Figure 25:
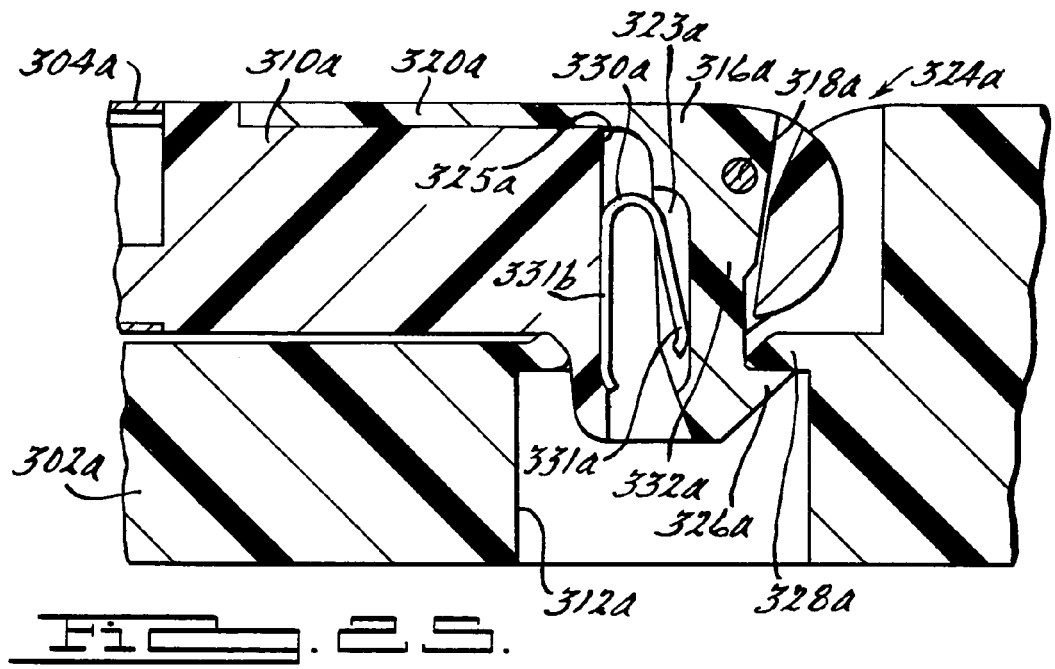
FIG. 25 is a cross-sectional view of the securing mechanism of the fourth embodiment vehicle article carrier in a locked mode.
Figure 26:
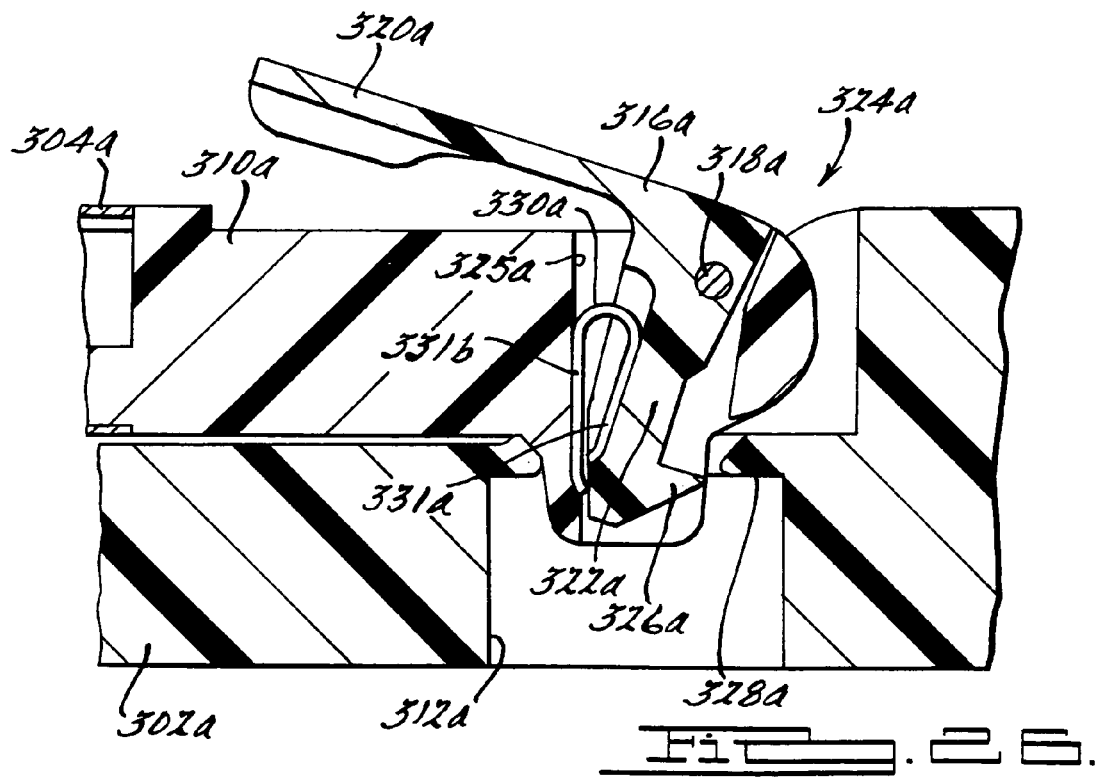
FIG. 26 is a cross-sectional view of the securing mechanism of the fourth embodiment vehicle article carrier in an unlocked mode.

Turning now to FIGS. 20 and 21, yet another embodiment of the present invention is illustrated. The vehicle article carrier 300 includes two laterally spaced apart support rails forming siderails 302a and 302b. A pair of crossbars 304a and 304b are coupled at opposite ends to the siderails 302a and 302b. The crossbars 304a and 304b are operable in a first or spanning mode, as illustrated in FIG. 20, extending across the space between the siderails 302a and 302b, and also in a second or stowed mode, as illustrated in FIG. 21, axially aligned with the siderails 302a and 302b.

To facilitate the transition between the spanning mode and the stowed mode, the crossbars 304a and 304b are rotatably and pivotally coupled to the siderails 302a and 302b. More particularly, the crossbar 304a includes a rotating and pivoting mechanism 306a pivotally coupled to the siderail 302b. Similarly, the crossbar 304b includes a rotating and pivoting mechanism 306b pivotally coupled to the siderail 302a.

A securing mechanism 308a is provided at the opposite end of the crossbar 304a relative to the pivoting mechanism 306a for securing the crossbar 304a to the siderail 302b in a stowed mode (see FIG. 21) and to the siderail 302a in a spanning mode (see FIG. 20). Similarly, a securing mechanism 308b is provided at the opposite end of the crossbar 304b relative to the pivoting mechanism 306b for securing the crossbar 304b to the siderail 302a in a stowed mode (see FIG. 21) and to the siderail 302b in a spanning mode (see FIG. 20). An exemplary securing mechanism 308a is illustrated in greater detail in FIGS. 22–26.

As shown in FIGS. 22–26, the securing mechanism 308a interconnects an end support 310a of the crossbar 304a with a mounting portion 312a of the siderail 302a. The end support 310a is preferably formed integrally with a lower portion of the crossbar 304a. The end support 310a includes a recessor pocket 314a accommodating a complementary shaped latch 316a therein.

The latch 316a is preferably pivotally mounted within the end support 310a by an axle 318a forming a pivot. The latch 316a is operable in a locked mode engaged with the siderail 302a (see FIGS. 22 and 25) and in an unlocked mode disengaged from the siderail 302a (see FIGS. 23 and 26). A handle 320a of the latch extends along an upper surface of the end support 310a and is oriented generally orthogonal to an arm 322a of the latch 316a. The handle 320a serves as a user operated lever to move the latch 316a between the locked and unlocked modes.

The arm 322a extends through a partially slotted opening 324a formed through the end support 310a. The slotted opening 324a is sized to accommodate the desired range of motion during pivoting of the latch 316a about the axle 318a. The arm 322a includes a catch 326a for frictionally engaging a lip 328a of the mounting portion 312a of the siderail 302a when the latch 316a is in the locked mode.

A biasing member in the form of a spring clip 330a is disposed in the slotted opening and one leg 331a is received in a notch 323a of the latch 316a. This helps to hold the spring clip 330a properly orientated within the slotted opening 324a. The other leg 331b of the spring clip 330a abuts a wall portion 325a of the end support 310a. The spring clip 330a urges the latch 316a towards the closed mode such that the catch 326a is biased to engage the lip 328a. To release the latch 316a, the bias of the spring clip 330a is overcome by lifting the handle 320a, the arm 322a pivots away from the lip 328a, and the catch 326a disengages therefrom. The crossbar 304a can then be lifted away from the mounting portion 312a and rotated relative to the siderail 302a. Although not illustrated, one skilled in the art should appreciate that the other securing mechanism 308b is preferably configured identically to the securing mechanism 308a.

Turning now to FIGS. 27–29, the rotating and pivoting mechanism 306a will be described. The mechanism 306a includes an endpiece 340a preferably formed integrally with a lower portion of the crossbar 304a. A guide member in the form of a pin 342a is positioned within a opening 344a formed in the endpiece 340a. The opening 344a includes a lower portion 344a, that is preferably shaped as a triangular slot, or a slot of non-constant cross sectional area, to allow pivoting of the crossbar 304a relative to the siderail 302b and pin 342a while simultaneously preventing rotation of the crossbar 304a about its own longitudinal axis. The rotation of the crossbar 304a about its own longitudinal axis is accomplished by the abutting engagement of the pin 342a with the walls of the opening 344a.

The lower portion of the endpiece 340a is partially spherically shaped to provide a radiused surface 346a. The radiused surface 346a nests within a complimentary shaped dish 348b secured within a cavity 350b of the siderail 302b. An orifice 352b is provided through the dish 348b to accommodate the pin 342a therein. The radiused surface 346a and dish 348b cooperate to control the pivoting and rotating of the crossbar 304a relative to the siderail 302b.

While not illustrated, one skilled in the art should appreciate that the other rotating and pivoting mechanism 306b is preferably formed identically to the rotating and pivoting mechanism 306a.

Referring now to FIG. 30, an end support 400 in accordance with an alternative preferred embodiment of the present invention is shown. The end support 400 forms a securing mechanism for latching a cross bar 402 to either mounting portion 312a or 312b of the support rails 302a and 302b, respectively (FIGS. 20 and 21). Cross bar 402 itself is otherwise identical in construction to cross bars 304a and 304b shown in FIGS. 20 and 21.

The end support 400 includes an integrally formed housing 404 which is fixedly secured to an outermost end of the cross bar 400 in a conventional manner, such as by a threaded fastening element (not shown). Disposed on, or within, the housing 404 is an actuating member 406, a latching member 408 and a resilient bumper member 410. Biasing members 412 and 414 are also disposed within the housing 404, and will be described in greater detail momentarily.

Referring further to FIG. 30, the actuating member 406 forms a lever having a graspable portion 416 and a mounting structure 418. The graspable portion 416 rests within a recessed portion 420 of an upper portion 422 of the housing 404. The mounting structure 418 is pivotally secured to the housing 404 via a pivot pin 424 that extends through a pair of aligned openings 426 in the mounting structure 418. As such, the actuating member 406 can pivot, relative to the housing 404, between a closed position and an open position. The mounting structure 418 also includes a pair of arcuate guide surfaces 428, the function of which will be discussed momentarily.

A lower portion 430 of the housing 404 extends elevationally below an opening 432 in the upper portion 422 of the housing. Within the opening 432 is disposed the latching member 408. The latching member 408 includes a pair of aligned openings 434 at an upper end 436, a pair of arcuate surfaces 438 at the upper end 436, and a hook or latch 440 at a lower end 442. With brief reference to FIG. 31, the latching member 408 is shown to also include a slot 444 formed therein. The latching member 408 is also pivotally secured to the housing 404 via the pivot pin 424 and is able to pivot between latched and unlatched positions relative to the mounting portions 312a or 312b.

With reference again to FIG. 30, the resilient bumper member 410 can be seen to include a flange 446 which allows the bumper member 410 to be press fit through an opening 448 in the lower portion 430 of the housing 404. The bumper member 410 prevents marring or scratching of the outer body surface of the vehicle in the event the user accidentally drops the housing 404 while moving the cross bar 402 between the stowed and operative positions. The bumper member 410 may be made from rubber or any other suitable material that will not scratch or mar a painted surface upon contact therewith.

Figure 32:
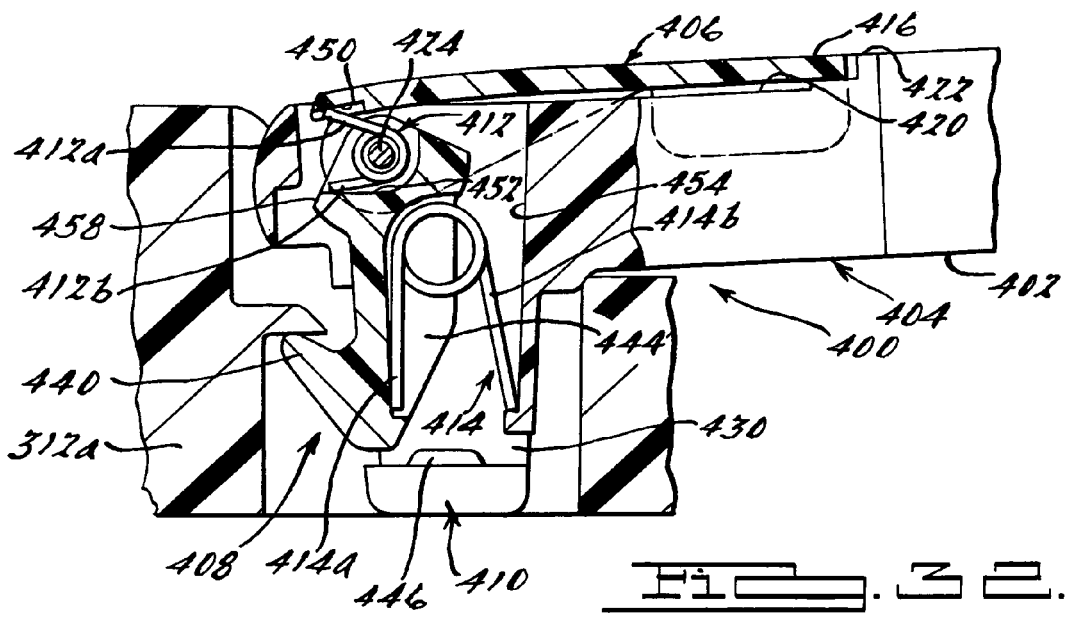
FIG. 32 is a side cross sectional view of the assembled end support of FIG. 30 showing the end support in the latched orientation relative to one of the side rails.

Referring to FIGS. 30 and 32, biasing member 412 forms a torsion spring that is placed with one leg 412a against an inner surface 450 of the actuating member 406 and the other leg 412b against a surface 452 of the actuating member 406. The biasing member 412 thus helps to maintain the actuating member 406 within the recessed area 420 of the housing 404 when the actuating member is in its closed position. Biasing member 414 is placed within the lower portion 430 of the housing 404 with one leg 414a in the slot 444 of the latching member 408 and the other leg 414b against the wall surface 454 of the lower portion 430 of the housing 404. The biasing member 414 serves to provide a constant biasing force which tends to bias the latching member 408 into engagement with the mounting portion 312a or 312b of one of the other support rails 302a or 302b when the housing 404 is latched to one of the mounting portions.

Figure 33:
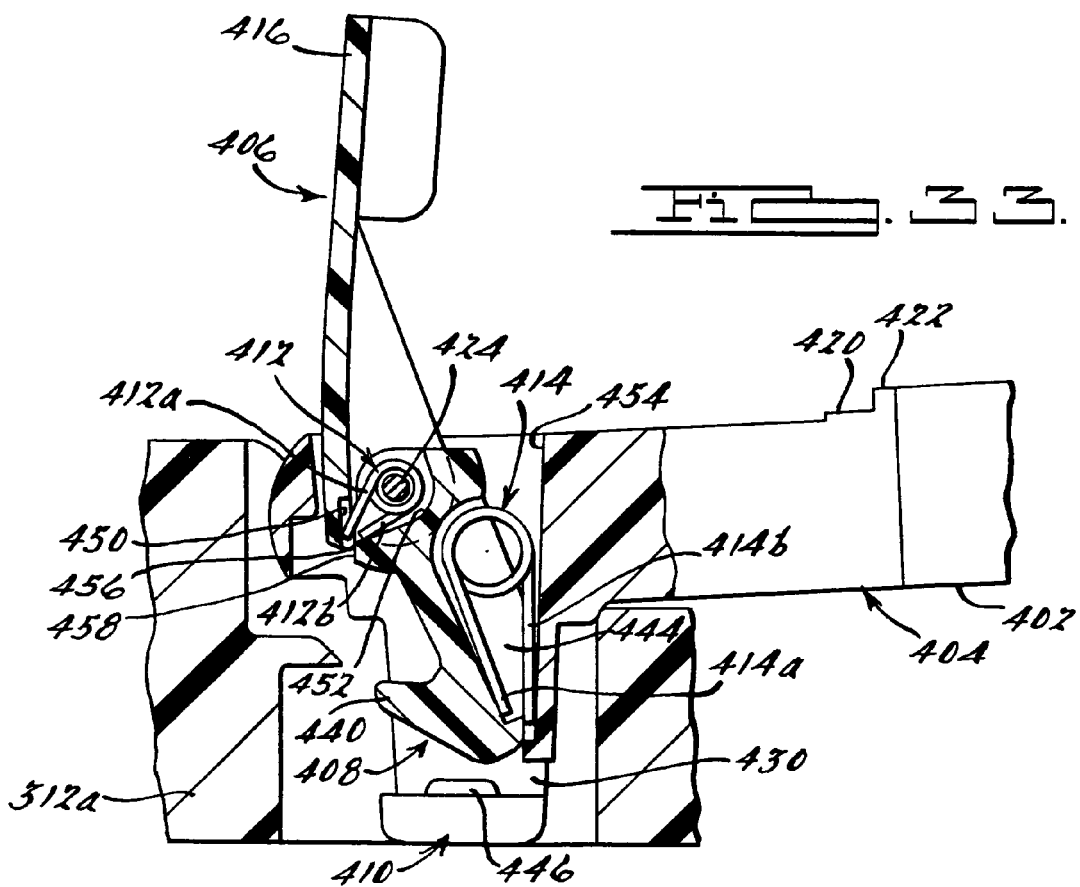
FIG. 33 is a view of the end support of FIG. 32 with the latching member moved into the unlatched position.

Referring now to FIGS. 32 and 33, the housing 404 is shown in latched and unlatched positions, respectively. Referring specifically to FIG. 32, when in the latched position, the actuating member 406 is in the closed position with the graspable portion 416 resting within the recess 420 in the upper portion 422 of the housing 404. The hook portion 440 of the latching member 408 is engaged with the mounting portion 312a of, in this example, support rail 302a.

In FIG. 33 the actuating member 406 has been moved to the open position. During this movement, an edge portion 456 of the actuating member 406 contacts an edge 458 of the latching member 408 and urges the latching member rotationally into an unlatched position relative to the mounting portion 312a of the support rail 302a. During this movement the curved surfaces 428 of the mounting portion 418 ride within the arcuate surfaces 438 of the latching member 408. From FIG. 32 it can be seen that the actuating member 406 is able to rotate a slight degree (preferably about 15–25 degrees), before contacting edge 458 and beginning to unlatch the latching member 408. Rotating the actuating member 406 after contacting edge 458 results in the actuating member beginning to unlatch the actuating member 408, and the additional biasing force of biasing member 414 is overcome as the user rotates the actuating member fully into the position shown in FIG. 33.

This pivotal securing of the actuating member 406 to the latching member 408 provides the benefit that the actuating member is able to be moved into a position perpendicular, or substantially perpendicular, to the upper portion 422 of the housing 404, providing the user with a more natural "feel" that the actuating member is in its fully open position. The biasing force provided by biasing member 412 provides a slight biasing force that causes the actuating member 406 to be immediately snapped back into the closed position once the operator releases the actuating member. It will also be appreciated that the arcuate surfaces 438 on the latching member 408 could be formed with short flat portions or protrusions that form detents to hold the actuating member in the open position of FIG. 33 once the user fully opens the actuating member 406.

Thus, a vehicle article carrier is provided which operates in two modes. In a first mode, the crossbars are stowed such that each lies parallel to a siderail. This mode reduces wind noise from the vehicle article carrier. In a second mode, the crossbars are oriented cross-wise to the longitudinal axis of the vehicle to span the space between the siderails and provide a support structure for carrying desired loads.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A vehicle article carrier for supporting articles above an outer body surface of a vehicle, comprising:

first and second support rails secured to said outer body surface generally parallel to one another, and orientated parallel to a longitudinal axis extending along said outer body surface;

said support rail rails each including first and second independent movable mounts each being slidably supported on its associated support rail, and each being adjustably positionable along its associated said support rail;

each of said first and second movable mounts having a locking assembly for fixed securing at a desired position along said side rail, and said first movable mounts on each of said support rails having a pivot mechanism associated therewith;

a pair of cross bars supported from said support rails for supporting articles thereon, each of said cross bars being coupled at a first end thereof to an associated one of the first movable mounts, and at a second end thereof to one of the second movable mounts on the same one of the side rails, when in a stowed mode, so that each said cross bar is disposed parallel with one of said side rails;

each of said cross bars including locking structure at the second ends thereof for fixedly securing each said second end of each said cross bar to an associated one of said second movable mounts when said cross bar is in said stowed mode, and to the other one of said second movable mounts on the other one of said support rails so that each said cross bar is disposed in a spanning mode extending perpendicularly between said support rails and is secured at said first and second ends thereof to said support rails.

2. The vehicle article carrier of claim 1, wherein said locking structure at the second end of each of said cross bars includes a shroud having a manually engageable locking wheel enabling an individual to grasp and unlock said second end of each of said cross bars from the second said movable mount to which it is secured.

3. The vehicle article carrier of claim 2, wherein said second slidable mounts that are adapted to engage with the second ends of said cross bars include a tab having an opening; and wherein said shrouds at said second ends of said cross bars each include a slotted opening formed by a pair of arm portions, with each of said arm portions having aligned openings; and wherein said locking wheel includes a shaft for engaging with said openings in said arm portions and said opening in said tab.

4. The vehicle article carrier of claim 1, wherein said locking assembly includes manually engageable locking wheels for securing and unsecuring their associated said movable mounts are desired positions along their respective said support rails.

5. A vehicle article carrier for supporting articles above an outer body surface of a vehicle, comprising:

first and second support rails secured to said outer body surface generally parallel to one another, and orientated parallel to a longitudinal axis extending along said outer body surface;

said support rail rails each including first and second independent movable mounts each being slidably supported on its associated support rail, and each being adjustably positionable along its associated said support rail;

each of said first and second movable mounts having a manually engageable locking wheel assembly for fixed securing at a desired position along said side rail, and said first movable mounts on each of said support rails having a pivot mechanism associated therewith;

a pair of cross bars supported from said support rails for supporting articles thereon, each of said cross bars being coupled at a first end thereof to an associated one of the first movable mounts, and at a second end thereof to one of the second movable mounts on the same one of the side rails, when in a stowed mode, so that each said cross bar is disposed parallel with one of said side rails;

each of said cross bars including a manually engageable locking wheel at the second ends thereof for fixedly securing each said second end of each said cross bar to an associated one of said second movable mounts when said cross bar is in said stowed mode, and to the other one of said second movable mounts on the other one of said support rails so that each said cross bar is disposed in a spanning mode extending perpendicularly between said support rails and is secured at said first and second ends thereof to said support rails.

6. The vehicle article carrier of claim 5, wherein each said cross bar includes a shroud at each end thereof, each said shroud including a slotted opening adapted to engage with one of said movable mounts to permit securing of each said end of said cross bar to a selected pair of said movable mounts.

7. The vehicle article carrier of claim 5, wherein one of said shrouds is non-releasably pivotally secured to one of said first movable mounts.

8. The vehicle article carrier of claim 5, wherein each of said first and second movable mounts includes a tab with an opening for enable securing of one end of one of said cross bars thereto.

9. The vehicle article carrier of claim 5, wherein:
   each of said support rails includes an elongated channel; and
   each of said elongated channels including a pair of threaded tap plates movable slidably therewithin.

10. The vehicle article carrier of claim 9, wherein said manually engageable locking wheel assemblies each include a threaded shaft for engaging with a respective one of said threaded tap plates.

11. The vehicle article carrier of claim 5, wherein each of said movable mounts includes an opening, and wherein an associated one of said manually engageable locking wheels is disposed within said opening for rotational movement.

12. A vehicle article carrier for supporting articles above an outer body surface of a vehicle, comprising:
   first and second support rails secured to said outer body surface generally parallel to one another, and orientated parallel to a longitudinal axis extending along said outer body surface;
   said support rail rails each including first and second independent movable mounts each being slidably supported on its associated support rail, and each being adjustably positionable along its associated said support rail;
   each of said first and second movable mounts having an opening with a manually engageable locking wheel assembly disposed within opening, each said movable mount being fixedly securable at a desired position along said side rail, and said first movable mounts on each of said support rails having a pivot mechanism associated therewith;
   a pair of cross bars supported from said support rails for supporting articles thereon, each of said cross bars having a shroud at each of first and second ends thereof, and each of said cross bars being coupled at said first end thereof to an associated one of the first movable mounts, and at said second end thereof to one of the second movable mounts on the same one of the side rails, when in a stowed mode, so that each said cross bar is disposed parallel with one of said side rails;
   each of said shrouds of each of said cross bars including a manually engageable locking wheel at the second ends thereof for fixedly securing each said second end of each said cross bar to an associated one of said second movable mounts when said cross bar is in said stowed mode, and to the other one of said second movable mounts on the other one of said support rails so that each said cross bar is disposed in a spanning mode extending perpendicularly between said support rails and is secured at said first and second ends thereof to said support rails.

* * * * *